US012406601B2

(12) United States Patent
Kim

(10) Patent No.: US 12,406,601 B2
(45) Date of Patent: *Sep. 2, 2025

(54) SOUND GENERATING DEVICE AND DISPLAY APPARATUS INCLUDING THE SAME

(71) Applicant: LG Display Co., Ltd., Seoul (KR)

(72) Inventor: Kwangho Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/427,822

(22) Filed: Jan. 31, 2024

(65) Prior Publication Data

US 2024/0169866 A1 May 23, 2024

Related U.S. Application Data

(63) Continuation of application No. 17/400,322, filed on Aug. 12, 2021, now Pat. No. 11,922,830, which is a (Continued)

(30) Foreign Application Priority Data

Nov. 2, 2018 (KR) ........................ 10-2018-0133612

(51) Int. Cl.
*H04R 9/06* (2006.01)
*G09F 27/00* (2006.01)
(Continued)

(52) U.S. Cl.
CPC ........... *G09F 27/00* (2013.01); *H04R 1/2807* (2013.01); *H04R 5/02* (2013.01); *H04R 7/045* (2013.01);
(Continued)

(58) Field of Classification Search
CPC ........ H04R 1/2807; H04R 5/02; H04R 7/045; H04R 9/025; H04R 9/06; H04R 2400/11;
(Continued)

(56) References Cited

U.S. PATENT DOCUMENTS 6,208,237 B1 3/2001 Saiki et al.
6,570,993 B1 5/2003 Fukuyama
(Continued)

FOREIGN PATENT DOCUMENTS

CN 1964580 A 5/2007
CN 102917295 A 2/2013
(Continued)

OTHER PUBLICATIONS

Office Action dated Dec. 29, 2022, issued in corresponding Taiwanese Divisional Patent Application No. 11121275970.
(Continued)

*Primary Examiner* — Huyen D Le
(74) *Attorney, Agent, or Firm* — Morgan, Lewis & Bockius LLP

(57) ABSTRACT

A sound generating device includes a plate, a frame outside of the plate, a magnet at the plate, a bobbin around the magnet, a coil outside the bobbin, and a connection part connected to the frame. The connection part includes a plurality of first connection parts configured around the frame and connected to the frame, and a second connection part configured around the frame and connected to the plurality of first connection parts. The connection part is configured to vibrate together with a vibration of the frame.

22 Claims, 13 Drawing Sheets

Related U.S. Application Data continuation of application No. 16/655,863, filed on Oct. 17, 2019, now Pat. No. 11,120,713.

(51) Int. Cl.

| | |
|---|---|
| ***H04R 1/28*** | (2006.01) |
| ***H04R 5/02*** | (2006.01) |
| ***H04R 7/04*** | (2006.01) |
| ***H04R 9/02*** | (2006.01) |

(52) U.S. Cl.

CPC ............... *H04R 9/025* (2013.01); *H04R 9/06* (2013.01); *H04R 2400/11* (2013.01); *H04R 2440/05* (2013.01); *H04R 2499/15* (2013.01)

(58) Field of Classification Search

CPC ............ H04R 2440/05; H04R 2499/15; H04S 2400/05; G09F 27/00; G09F 9/301

See application file for complete search history.

(56) References Cited

U.S. PATENT DOCUMENTS

| | | | | |
|---|---|---|---|---|
| 7,050,600 | B2 | 5/2006 | Saiki et al. | |
| 7,174,025 | B2 | 2/2007 | Azima et al. | |
| 7,369,674 | B2 | 5/2008 | Miura | |
| 9,635,446 | B2 | 4/2017 | Won | |
| 10,219,079 | B2 * | 2/2019 | Choi | H04R 1/025 |
| 10,409,325 | B2 | 9/2019 | Choi et al. | |
| 11,120,713 | B2 | 9/2021 | Kim | |
| 11,922,830 | B2 * | 3/2024 | Kim | H04R 1/2807 |
| 2001/0026625 | A1 | 10/2001 | Azima et al. | |
| 2007/0116322 | A1 | 5/2007 | Horigome et al. | |
| 2008/0232635 | A1 | 9/2008 | Corynen | |
| 2010/0215207 | A1 | 8/2010 | Funahashi | |
| 2015/0365746 | A1 | 12/2015 | Cheung | |
| 2017/0280216 | A1 | 9/2017 | Lee et al. | |
| 2017/0289694 | A1 | 10/2017 | Choi et al. | |
| 2018/0054679 | A1 | 2/2018 | Kono | |
| 2018/0317000 | A1 | 11/2018 | Ham et al. | |
| 2019/0196537 | A1 | 6/2019 | Choi et al. | |

FOREIGN PATENT DOCUMENTS

| | | | |
|---|---|---|---|
| CN | 106664491 | A | 5/2017 |
| CN | 107295446 | A | 10/2017 |
| CN | 108632700 | A | 10/2018 |
| EP | 3331251 | A | 6/2018 |
| KR | 10-2014-0039813 | A | 4/2014 |
| KR | 10-2017-0135465 | A | 12/2017 |
| KR | 10-1817102 | B1 | 1/2018 |
| KR | 10-2018-0062320 | A | 6/2018 |
| TW | 201125378 | A | 7/2011 |
| TW | 201703546 | A | 1/2017 |
| TW | M553908 | U | 1/2018 |
| TW | 201821869 | A | 6/2018 |

OTHER PUBLICATIONS

Official Notice dated Mar. 10, 2022, issued in counterpart Korean Patent Application No. 10-2021-0006047.

Notice of Allowance dated Nov. 26, 2019, from the Korean Patent Office in corresponding Korean Patent Application No. 10-2018-0133612.

Office Action dated Aug. 29, 2024, issued in corresponding Taiwanese Patent Application No. 112126942.

Office Action issued Nov. 14, 2023 for counterpart Chinese Divisional Patent Application No. 202111582990.0.

Office Action dated Nov. 10, 2020, from the Taiwanese Patent Office in corresponding Taiwanese Patent Application No. 10921088330.

Office Action issued in corresponding Taiwanese Patent Application No. 11420218860, dated Feb. 27, 2025.

* cited by examiner

SOUND GENERATING DEVICE AND DISPLAY APPARATUS INCLUDING THE SAME

CROSS-REFERENCE TO RELATED APPLICATION(S)

This application is a continuation of U.S. patent application Ser. No. 17/400,322, filed on Aug. 12, 2021, which is a continuation of U.S. patent application Ser. No. 16/655,863, filed on Oct. 17, 2019, now U.S. Pat. No. 11,120,713, which claims the benefit of and priority to Korean Patent Application No. 10-2018-0133612, filed on Nov. 2, 2018. The foregoing prior U.S. and Korean patent applications are hereby incorporated by reference in their entirety as if fully set forth herein.

BACKGROUND

Technical Field

The present disclosure relates to a display apparatus, and more particularly, to a display apparatus configured to vibrate a display panel to generate sound.

Discussion of the Related Art

Recently, as information-oriented society advances, the field of display apparatuses for visually displaying an electrical information signal has rapidly advanced. Various display apparatuses having excellent performance, thinness, light weight, and low power consumption are being developed.

Examples of the display apparatuses may include liquid crystal display (LCD) apparatuses, field emission display (FED) apparatuses, organic light emitting display apparatuses, light emitting diode display apparatuses, quantum dot light emitting display apparatuses, and micro light emitting diode display apparatuses.

An LCD apparatus may include an array substrate including a thin film transistor (TFT), an upper substrate including a color filter and/or a black matrix, and a liquid crystal layer between the array substrate and the upper substrate. An alignment state of the liquid crystal layer may be adjusted with an electric field generated between two electrodes in a pixel area, and a transmittance of light may be adjusted based on the alignment state, thereby displaying an image.

An organic light emitting display apparatus, which is a self-emitting device, may have low power consumption, a fast response time, high emission efficiency, excellent luminance, and a wide viewing angle.

Generally, a display apparatus may include a display panel that displays an image and a sound device that outputs sound along with the image. In the display apparatus, a sound generated by the sound device may travel toward a rear surface of the display panel or toward a region under the display panel, instead of toward a front surface of the display panel. Therefore, sound quality may be degraded due to interference of a sound reflected from a wall or a floor. For this reason, it may be difficult to provide a clear sound from the sound device without hindering an immersion experience of a user.

Moreover, when a speaker in a set apparatus such as a television (TV), a computer monitor, a notebook computer, or a desktop personal computer (PC) is provided, the speaker occupies a certain space. Due to this, the design and space disposition of the set apparatus may be limited.

SUMMARY

Accordingly, the present disclosure is directed to a display apparatus that substantially obviates one or more problems due to limitations and disadvantages of the related art.

Therefore, the inventors have recognized the above-described problems and have performed various experiments so that when watching an image in front of a display panel, a traveling direction of a sound becomes a direction toward a front surface of the display panel, and thus, sound quality is enhanced. Through the various experiments, the inventors have invented a display apparatus having a new structure, which may output a sound so that a traveling direction of the sound becomes a direction toward a front surface of a display panel, thereby enhancing sound quality.

An aspect of the present disclosure is to provide a display apparatus including a sound generating device for generating sound that travels toward a region in front of a display panel and enhances a sound output characteristic of a low-pitched sound band.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display apparatus, including a display panel configured to display an image; a supporting member on a rear surface of the display panel and configured to support the display panel; a sound generating device on the rear surface of the display panel and configured to vibrate the display panel to generate sound; and a connection part configured to connect the supporting member to the sound generating device, wherein the sound generating device includes a plate spaced apart from the supporting member; a frame outside the plate; a magnet and a center pole on the plate; a bobbin around the center pole; and a coil outside the bobbin, wherein the connection part is between the supporting member and the frame.

In another aspect, there is provided a display apparatus, including a display panel configured to display an image and including a first region, a second region, and a third region; a sound generating device in at least one of the first region, the second region, and the third region at a rear surface of the display panel; a supporting member on the rear surface of the display panel, the supporting member being spaced apart from the sound generating device; and a connection part between the sound generating device and the supporting member.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, which may be included to provide a further understanding of the disclosure and are incorporated in and constitute a part of this application, illustrate embodiments of the disclosure and together with the description serve to explain various principles of the disclosure.

DETAILED DESCRIPTION

Figure 1A:
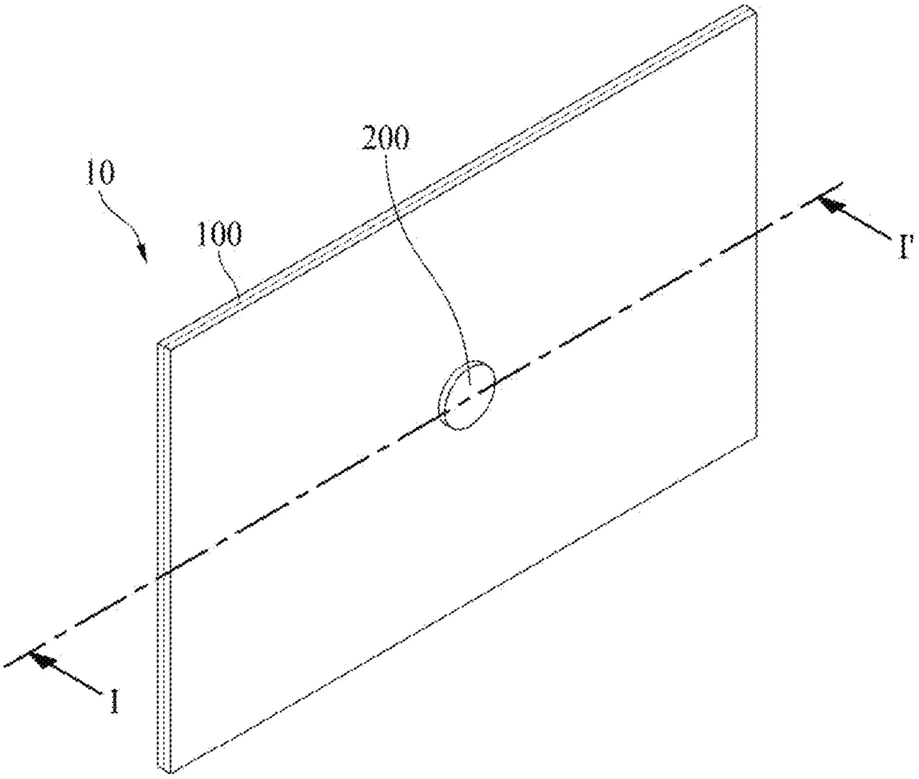
FIG. 1A illustrates a display apparatus including a sound generating device according to an embodiment of the present disclosure.

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where "comprise," "have," and "include" described in the present specification are used, another part may be added unless "only" is used. The terms of a singular form may include plural forms unless referred to the contrary.

In construing an element, the element is construed as including an error range although there is no explicit description.

In describing a position relationship, for example, when a position relation between two parts is described as "on," "over," "under," and "next" one or more other parts may be disposed between the two parts unless "just(ly)" or "direct (ly)" is used.

In describing a time relationship, for example, when the temporal order is described as 'after~', 'subsequent~', 'next~', and 'before~', a case which is not continuous may be included unless "just(ly)" or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as first, second, A, B, (a), (b), etc., may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it can be directly on or directly connected to the other element or layer, or intervening elements or layers may be present. Also, it should be understood that when one element is disposed on or under another element, this may denote a case where the elements are disposed to directly contact each other, but may denote that the elements are disposed without directly contacting each other.

The term "at least one" should be understood as including any and all combinations of one or more of the associated listed elements. For example, the meaning of "at least one of a first element, a second element, and a third element" denotes the combination of all elements proposed from two or more of the first element, the second element, and the third element as well as the first element, the second element, or the third element.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

In adding reference numerals to elements of each of the drawings, although the same elements are illustrated in other drawings, like reference numerals may refer to like elements.

In the present disclosure, examples of a display apparatus may include a narrow-sense display apparatus such as an organic light emitting diode (OLED) display module or a liquid crystal module (LCM) having a display panel and a driver for driving the display panel. Also, examples of the display apparatus may include a set device (or a set apparatus) or a set electronic device such as a notebook computer, a TV, a computer monitor, an equipment apparatus including an automotive apparatus or another type of apparatus for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set device, which is a final consumer device or an application product including the LCM or the OLED module.

In some embodiments, an LCM or an OLED module including a display panel and a driver may be referred to as a narrow-sense display apparatus, and an electronic device, which is a final product including an LCM or an OLED module may be referred to as a set device. For example, the narrow-sense display apparatus may include a display panel, such as an LCD or an OLED, and a source printed circuit board (PCB), which is a controller for driving the display panel. The set device may further include a set PCB, which is a set controller electrically connected to the source PCB to overall control the set device.

A display panel applied to the present embodiments may use any type of display panel, including a liquid crystal display panel, an organic light emitting diode (OLED) display panel, and an electroluminescent display panel, but is not limited to a specific display panel. According to the present embodiments, the display panel is vibrated by a sound generation device to output a sound. Also, a shape or a size of a display panel applied to a display apparatus according to the present embodiments is not limited.

In an example where the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT), which is a switching element for adjusting a light transmittance of each of the plurality of pixels, an upper substrate including a color filter and/or a black matrix, and a liquid crystal layer between the array substrate and the upper substrate.

In an example where the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT, which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

The display panel may further include a backing such as a metal plate attached on the display panel. However, the present embodiments are not limited to the metal plate, and the display panel may include another structure.

In the present disclosure, the display panel may be applied to vehicles as a user interface module, such as a central control panel for automobiles. For example, the display panel may be provided between occupants sitting in two front seats in order for a vibration of the display panel to be transferred to the inside of a vehicle. Therefore, an audio experience in a vehicle may be improved in comparison with a case where speakers are disposed on interior sides of the vehicle.

Hereinafter, embodiments of the present disclosure will be described in detail with reference to the accompanying drawings.

FIG. 1A illustrates a display apparatus including a sound generating device according to an embodiment of the present disclosure. Particularly, FIG. 1A illustrates a rear surface of the display apparatus 10. With reference to FIG. 1A, the display apparatus 10 may include a display panel 100, which may display an image, and a sound generating device 200. The sound generating device 200 may be on a rear surface of the display panel 100, and may vibrate the display panel 100 to generate sound. For example, the sound generating device 200 may directly vibrate the display panel 100 to output sound in a direction toward a front surface of the display panel 100.

The display panel 100 may display an image (for example, an electronic image or a digital image), and may be implemented as any type of display panel, such as a liquid crystal display panel, an organic light emitting diode (OLED) display panel, an electroluminescent display panel, etc. The display panel 100 may vibrate based on a vibration of the sound generating device 200 to output sound.

According to an embodiment of the present disclosure, the display panel 100 may display an image according to a particular emission type, such as a top emission type, a bottom emission type, or a dual emission type, based on a structure of a pixel array layer including an anode electrode, a cathode electrode, and an organic compound layer. In the top emission type, visible light emitted from the pixel array layer may be irradiated onto a region in front of a base substrate to allow an image to be displayed. In the bottom emission type, the visible light emitted from the pixel array layer may be irradiated onto a rearward region behind the base substrate to allow an image to be displayed.

The sound generating device 200 may generate sound using the display panel 100 as a vibration plate. The sound generating device 200 may be referred to as an "actuator," an "exciter," or a "transducer," but is not limited thereto. For example, the sound generating device 200 may be a sound device for outputting sound according to an electrical signal.

Figure 1B:
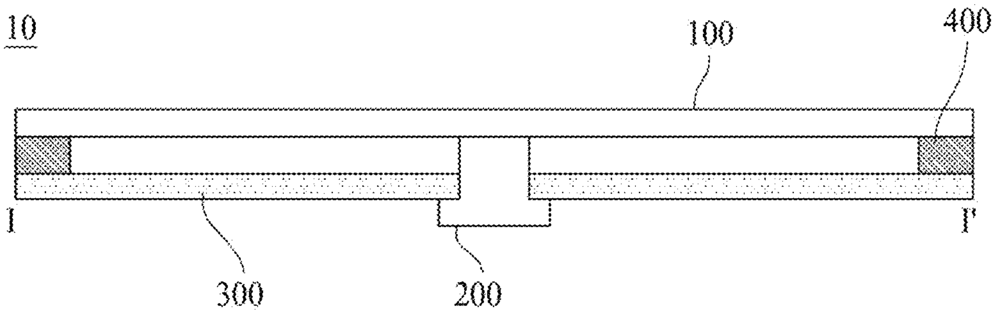
FIG. 1B is a cross-sectional view taken along line I-I' of FIG. 1A.

FIG. 1B is a cross-sectional view taken along line I-I' of FIG. 1A. With reference to FIG. 1B, the display apparatus 10 may include the sound generating device 200 and a supporting member 300.

The supporting member 300 may support one or more of a rear surface and a side surface of the display panel 100. Also, the sound generating device 200 may be fixed to the supporting member 300.

The supporting member 300 may be, for example, a cover bottom. For example, the supporting member 300 may include a middle cabinet, which may be coupled to a cover bottom to surround the side surface (or a lateral surface) of the display panel 100 and accommodate one edge or periphery of the display panel 100 to support the display panel 100. For example, the middle cabinet may include a sideways-"T" (⊣)-shaped cross-sectional surface (or a T-shape having a 90-degree angle). The supporting member 300 may include the cover bottom, or may include the cover bottom and the middle cabinet, but a structure thereof is not limited thereto. For example, the supporting member 300 may include an arbitrary structure that supports the rear surface and/or the side surface of the display panel 100.

Moreover, the supporting member 300 may be a plate member that may be provided on the rear surface of the display panel 100 or over (e.g., over an entirety of) the display panel 100. For example, the supporting member 300 may cover the whole rear surface of the display panel 100 to be spaced apart from the rear surface of the display panel 100 by a predetermined air gap or distance. Also, the supporting member 300 may have a plate shape formed of a glass material, a metal material, or a plastic material. Here, an edge or a sharp corner of the supporting member 300 may have a tetragonal (e.g., quadrilateral) shape or a curved shape, e.g., through a chamfer process or a corner rounding process. According to an embodiment of the present disclosure, the supporting member 300 including the glass material may include sapphire glass.

The supporting member 300 including the metal material may be formed of one or more of aluminum (Al), an Al alloy, a magnesium (Mg) alloy, and an iron (Fe)-nickel (Ni) alloy. As another example, the supporting member 300 may have a stacked structure including a glass plate and a metal plate, in which the metal plate may have a thickness relatively thinner than the glass plate, and the glass plate may face the rear surface of the display panel 100. A rear surface of the display apparatus 10 may be used as a mirror surface due to a metal plate included in the stacked structure. However, the embodiments are not limited to the above materials or shape.

The supporting member 300 may include a through-hole or other hole into which the sound generating device 200 is inserted or accommodated. The through-hole or other hole may be located either in a center or out of a center of the area of the supporting member 300. For example, the through-hole or other hole may be bored in a certain partial region of the supporting member 300 along a thickness direction of the supporting member 300 to have a circular shape or a polygonal shape, for the sound generating device 200 to be inserted or accommodated into the through-hole.

In the present disclosure, the supporting member 300 may be referred to as a "cover bottom," a "plate bottom," a "back cover," a "base frame," a "metal frame," a "metal chassis," a "chassis base," or an "m-chassis." The supporting member 300 may be a supporter for supporting the display panel 100 and may be implemented as any type of frame or plate structure on the rear surface of the display apparatus 10.

An adhesive member 400 may be in an edge or periphery of the display panel 100 and the supporting member 300. For example, the adhesive member 400 may be between the rear surface of the display panel 100 and an upper surface of the supporting member 300. The adhesive member 400 may attach the display panel 100 and the supporting member 300. The adhesive member 400 may include a double-sided tape, a single-sided tape, an adhesive, a bond, and/or the like, but is not limited thereto.

Figure 2A:
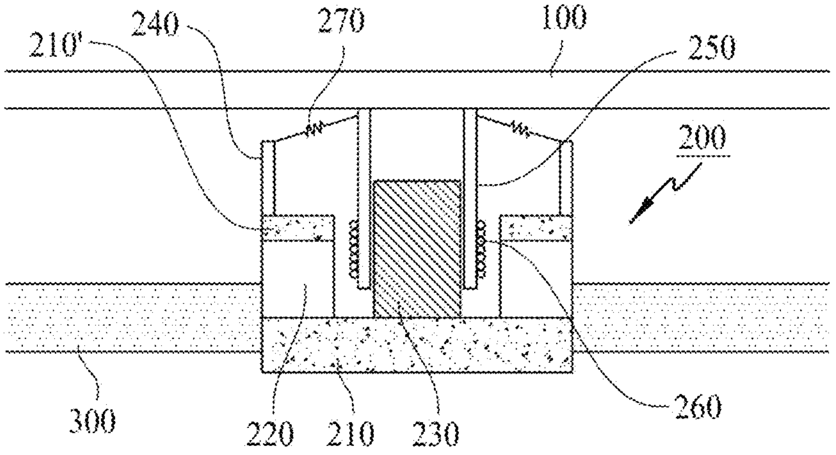
FIGS. 2A and 2B are cross-sectional views of a sound generating device according to an embodiment of the present disclosure.
Figure 2B:
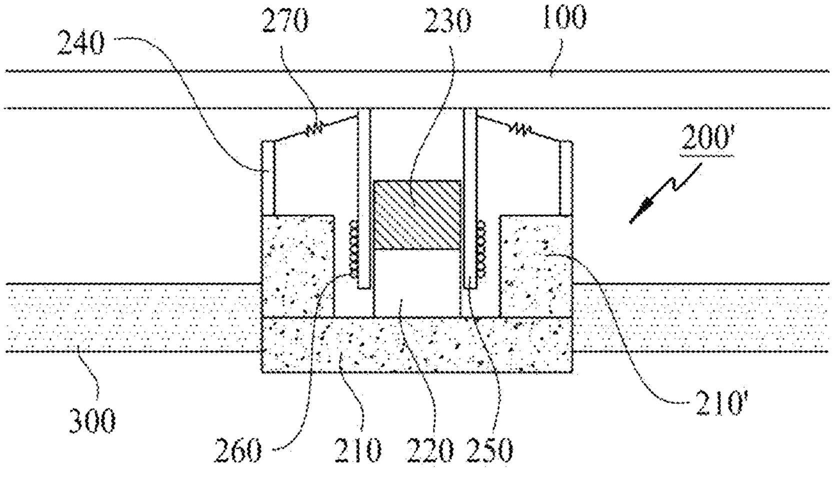

FIGS. 2A and 2B are cross-sectional views of a sound generating device according to an embodiment of the present disclosure.

The sound generating device may be classified into a first structure, in which a magnet may be outside a coil, and a second structure, in which a magnet may be inside a coil. The first structure may be referred to as a "dynamic type" or an "external magnetic type," and the second structure may be referred to as a "micro type" or an "internal magnetic type." FIG. 2A illustrates the first structure, and FIG. 2B illustrates the second structure.

With reference to FIG. 2A, a sound generating device 200 may include a plurality of plates (for example, first and second plates) 210 and 210', a magnet 220 on a corresponding plate, a center pole 230 on a corresponding plate, a bobbin 250 around the center pole 230, and a coil 260 wound around the bobbin 250.

For example, the magnet 220 may be on the first plate 210, and the second plate 210' may be on the magnet 220. The first plate 210 and the second plate 210' may support the magnet 220, and may fix the sound generating device 200 to a supporting member 300. The first plate 210 may be fixed to a supporting hole in the supporting member 300, and the magnet 220 may be fixed and supported between the first plate 210 and the second plate 210'.

At least one of the first plate 210 and the second plate 210' may include a material such as iron (Fe). Each of the first plate 210 and the second plate 210' is not limited to the term "plate." For example, the first plate 210 or the second plate 210' may be referred to as a "yoke" or the like.

The magnet 220 may be implemented with a sintered magnet, such as barium ferrite, and a material of the magnet 220 may use iron (III) oxide ($Fe_2O_3$), barium carbonate ($BaCO_3$; "witherite"), a neodymium magnet, strontium ferrite ($Fe_{12}O_{19}Sr$), e.g., with improved magnet component, an alloy cast magnet including Al, nickel (Ni), and cobalt (Co), and/or the like, but is not limited thereto. In an example, the neodymium magnet may be neodymium-iron-boron (Nd—Fe—B). However, embodiments are not limited thereto.

A frame 240 may be on the second plate 210' along an edge or periphery of the first plate 210. A center pole 230 may be in a center region of the first plate 210. Also, the center pole 230 and the first plate 210 may be provided as one body. The center pole 230 may be referred to as "pole pieces." In an example, pole pieces may be further included on the center pole 230.

The bobbin 250 may surround the center pole 230. The coil 260 may be wound around a lower region (for example, a lower outer surface) of the bobbin 250, and a current for generating a sound may be applied to the coil 260. The bobbin 250 may be a ring-shaped structure, which may include paper, an Al sheet, and/or the like. Coil 260 may be wound around a certain lower region of the bobbin 250. The bobbin 250 and the coil 260 may be termed a "voice coil." A damper 270 may be between the frame 240 and a portion of an upper portion of the bobbin 250. The damper may be referred to as an "edge" or the like.

FIG. 2B illustrates a second structure in which a magnet may be inside a coil.

With reference to FIG. 2B, a sound generating device 200' having the second structure may include a magnet 220 on a first plate 210, a center pole 230 on the magnet 220, a bobbin 250 near (e.g., around) the magnet 220 and the center pole 230, and a coil 260 wound around the bobbin 250.

For example, the first plate 210 may be fixed to a supporting hole in a supporting member 300. The magnet 220 may be on the first plate 210, and the center pole 230 may be on the magnet 220. The center pole 230 may be referred to as "pole pieces." In an example, pole pieces may be further included on the center pole 230. The bobbin 250 may surround the magnet 220 and the center pole 230, and the coil 260 may be wound around the bobbin 250.

A second plate 210' may be on the first plate 210, and a frame 240 may be on the second plate 210'. For example, a damper 270 may be between the frame 240 and the bobbin 250.

In comparison with the first structure in which a magnet may be outside a coil, the second structure including an internal magnet may be small in leakage of magnetic flux, and may reduce a total size of a sound generating device. The sound generating device applied to the display apparatus according to an embodiment of the present disclosure is not limited to the first structure illustrated in FIG. 2A and the second structure illustrated in FIG. 2B. For example, the display apparatus according to an embodiment of the present disclosure may include another kind of sound generating device, which may vibrate a display panel to generate sound.

Figure 3A:
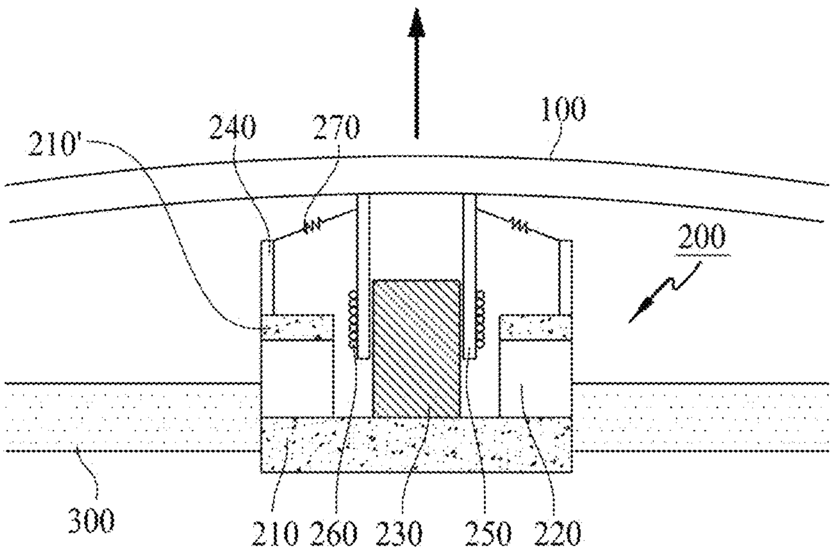
FIGS. 3A and 3B are diagrams for describing a sound generating operation performed by a sound generating device having a first structure according to an embodiment of the present disclosure.
Figure 3B:
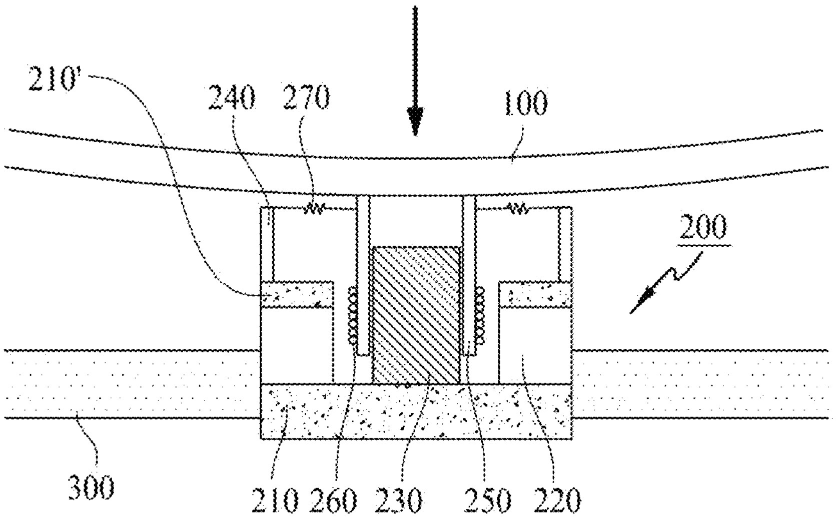

FIGS. 3A and 3B illustrate a sound generating operation performed by a sound generating device having a first structure according to an embodiment of the present disclosure. FIG. 3A illustrates a state in which a current may be applied.

The center pole 230 connected to a lower surface of the magnet 220 may be a north (N)-pole, and the second plate 210' connected to an upper surface of the magnet 220 may be a south (S)-pole, whereby an external magnetic field may be generated around the coil 260. The north and south poles may be interchangeable.

In this state, when a current for generating a sound is applied to the coil 260, an application magnetic field may be generated around the coil 260, and a force for moving the bobbin 250 to an upper portion may be generated by the application magnetic field and an external magnetic field. For example, when a current is applied to the coil 260, a magnetic field may be generated around the coil 260. Thus, the bobbin 250 may be guided by the center pole 230, and may move to the upper portion according to Fleming's Left-Hand Rule for Motors based on the generated magnetic field and the external magnetic field generated by the magnet 220.

Therefore, one surface of the bobbin 250 may contact a rear surface of the display panel 100. Thus, the bobbin 250 may vibrate the display panel 100 in an upward direction (illustrated by an arrow) according to whether a current is applied to the coil 260 or not, and a sound wave (or a sound) may be generated by the vibration of the display panel 100. In this state, when the application of the current stops or a reverse current is applied, as illustrated in FIG. 3B, a force for moving the bobbin 250 to a lower portion may be generated according to the principle similar to description given above with reference to FIG. 3A, and the display panel 100 may vibrate in a downward direction (illustrated by an arrow).

The damper 270 may be between a portion of an upper portion of the bobbin 250 and the frame 240. The damper 270 may have a creased structure and may be contracted and relaxed based on a vertical motion of the bobbin 250 to control a vertical vibration of the bobbin 250. For example, the damper 270 may be connected to the bobbin 250 and the frame 240. Thus, the vertical vibration of the bobbin 250 may be controlled by a restoring force of the damper 270. For example, when the bobbin 250 vibrates by a certain height or more, or vibrates by a certain height or less, the bobbin 250 may be restored to its original position by the restoring force of the damper 270. Therefore, the display panel 100 may vertically vibrate based on a direction and level of a current applied to the coil 260, and a sound wave may be generated by the vibration.

Figure 4A:
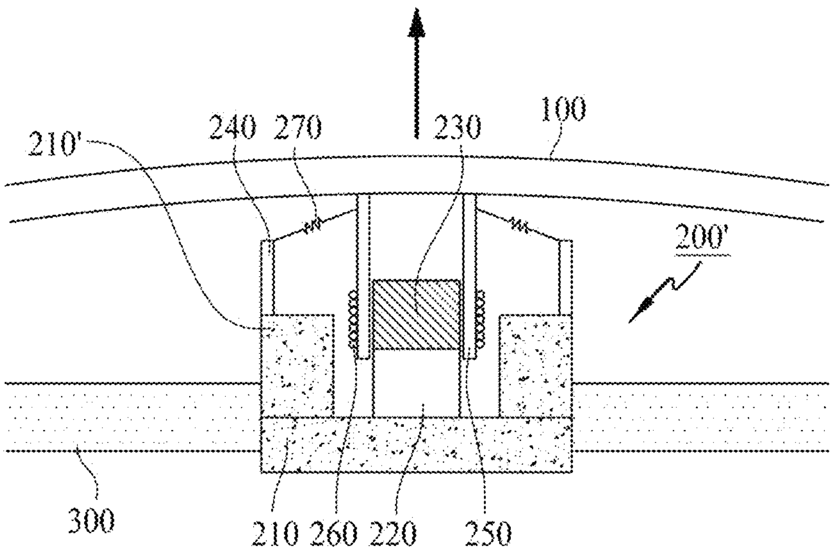
FIGS. 4A and 4B are diagrams for describing a sound generating operation performed by a sound generating device having a second structure according to an embodiment of the present disclosure.
Figure 4B:
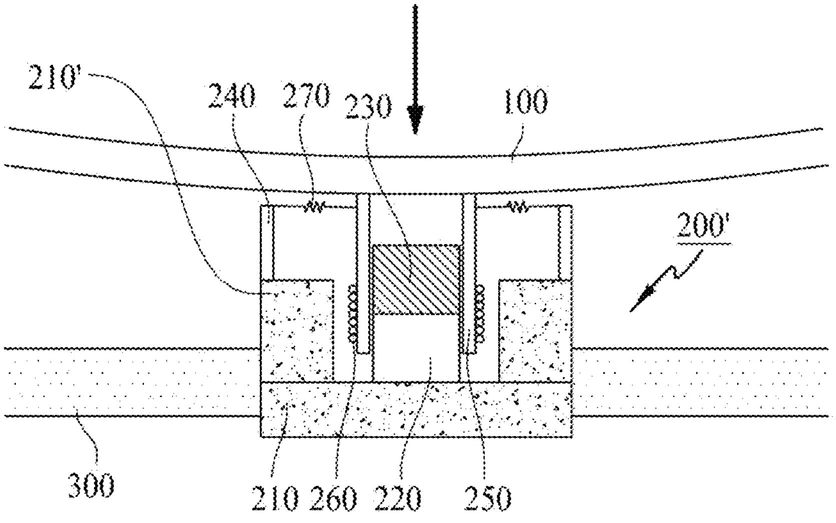

FIGS. 4A and 4B illustrate a sound generating operation performed by a sound generating device having a second structure according to an embodiment of the present disclosure.

FIG. 4A illustrates a state in which a current may be applied. The second plate 210' may be an S-pole, and the center pole 230 connected to an upper surface of the magnet 220 may be an N-pole, whereby an external magnetic field may be generated around the coil 260. The S-pole and the N-pole may switch therebetween, and if the S-pole and the N-pole switch therebetween, the sound generating device may identically operate by correcting a winding direction of the coil 260. In this state, when a current for generating a sound is applied to the coil 260, an application magnetic field may be generated around the coil 260, and a force for moving the bobbin 250 to an upper portion may be generated by the application magnetic field and an external magnetic field. For example, when a current is applied to the coil 260, a magnetic field may be generated around the coil 260. Thus, the bobbin 250 may be guided by the center pole 230, and may move to the upper portion according to Fleming's Left-Hand Rule for Motors based on the generated magnetic field and the external magnetic field generated by the magnet 220.

Therefore, one surface of the bobbin 250 may contact a rear surface of the display panel 100. Thus, the bobbin 250 may vibrate the display panel 100 in an upward direction (illustrated by an arrow) according to whether a current is applied to the coil 260 or not, and a sound wave (or a sound) may be generated by the vibration of the display panel 100. In this state, when the application of the current stops or a reverse current is applied, as illustrated in FIG. 4B, a force for moving the bobbin 250 to a lower portion may be generated according to the principle similar to description given above with reference to FIG. 4A, and the display panel 100 may vibrate in a downward direction (illustrated by an arrow).

The damper 270 may be between a region of an upper portion of the bobbin 250 and the frame 240. The damper 270 may have a creased structure, and may be contracted and relaxed based on a vertical motion of the bobbin 250 to control a vertical vibration of the bobbin 250. For example, the damper 270 may be connected to the bobbin 250 and the frame 240. Thus, the vertical vibration of the bobbin 250 may be controlled by a restoring force of the damper 270. For example, when the bobbin 250 vibrates by a certain height or more or vibrates by a certain height or less, the bobbin 250 may be restored to its original position by the restoring force of the damper 270. Therefore, the display panel 100 may vertically vibrate based on an application direction and level of a current applied to the coil 260, and a sound wave may be generated by the vibration.

Figure 5:
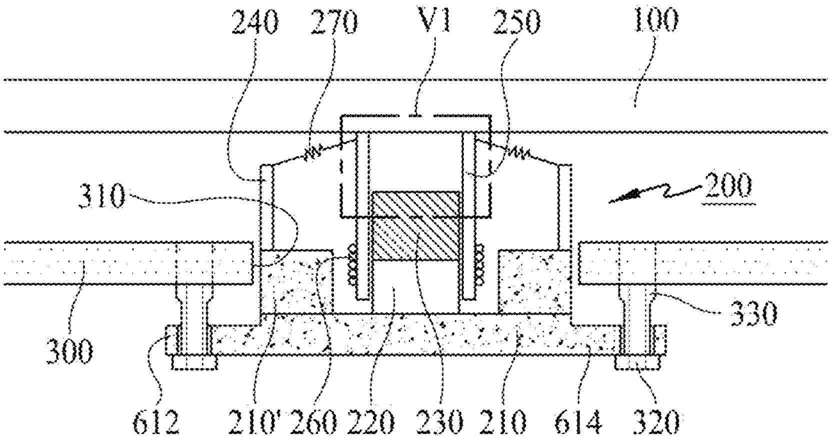
FIG. 5 illustrates a coupling structure of a supporting member and a sound generating device according to an embodiment of the present disclosure.

FIG. 5 illustrates a coupling structure of a supporting member and a sound generating device according to an embodiment of the present disclosure.

In an embodiment of the present disclosure, any of a sound generating device having the first structure and a sound generating device having the second structure may be applied. Hereinafter, a sound generating device having the second structure will be described as an example.

With reference to FIG. 5, a sound generating device 200 may include a diameter enlargement part 614. The diameter enlargement part 614 may be provided as one body with a first plate 210 of the sound generating device 200. One side of the first plate 210 may include a protrusion that is greater than a diameter of the other portion of the first plate 210. The protrusion region having an enlarged diameter may be referred to as the diameter enlargement part 614. The diameter enlargement part 614 may have a ring shape. Also, an extension part 612 for fixing the sound generating device 200 may be in a portion of the diameter enlargement part 614.

A screw 320 and a nut 330 may be in the extension part 612. The sound generating device 200 may be coupled to a supporting member 300 by the screw 320 using the nut 330 fixed to the supporting member 300. The nut 330 may be, for example, a self-clinching nut. An example of the self-clinching nut may include a PEM® nut, and the present embodiment is not limited thereto. Therefore, the sound generating device 200 may be accommodated into a supporting hole 310 in the supporting member 300.

If the self-clinching nut is used, a portion of a vibration generated by the sound generating device 200 may be absorbed by the self-clinching nut, which may be the nut 330. Thus, a vibration transferred to the supporting member 300 may be reduced.

With reference to FIG. 5, a structure according to the present embodiment may be a structure where the first plate 210 of the sound generating device 200 is fixed to the supporting member 300, and the bobbin 250 may vibrate upward and downward (illustrated by V1). Because the supporting member 300 of the sound generating device 200 may be fixed by the screw 320, the stiffness of the first plate 210 may increase. Thus, in the embodiment shown in FIG. 5, even when a resonance frequency of the sound generating device 200 is reduced, a low-pitched sound band of a sound output from the sound generating device 200 may not be reduced. Embodiments described below with reference to FIGS. 6 and 7 may decrease a resonance frequency of the sound generating device and improve a low-pitched sound band.

Figure 6A:
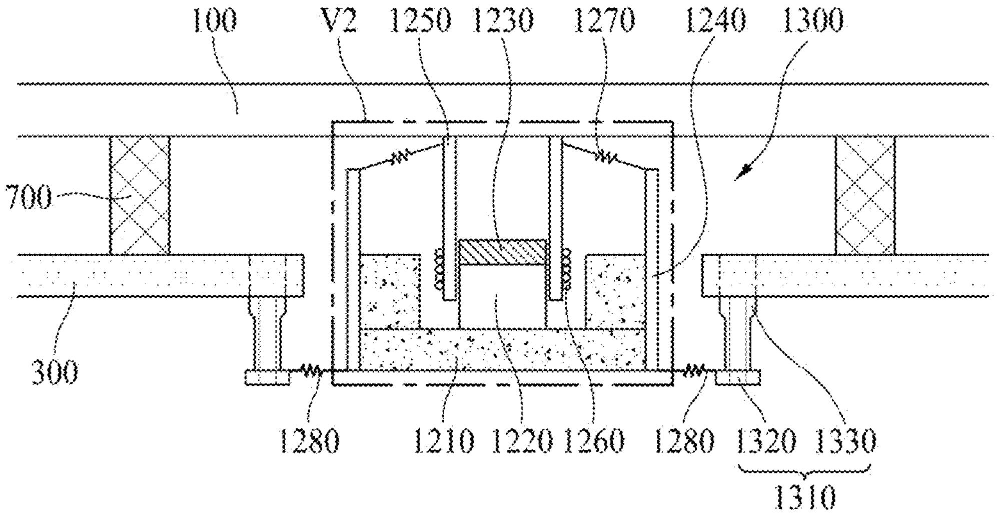
FIGS. 6A and 6B illustrate a sound generating device according to another embodiment of the present disclosure.
Figure 6B:
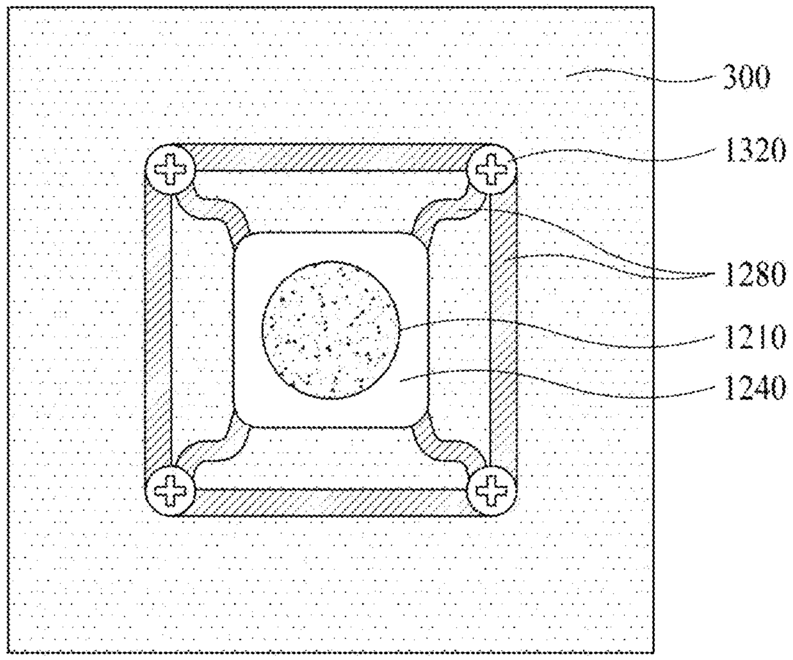

FIGS. 6A and 6B illustrate a sound generating device according to another embodiment of the present disclosure.

In an embodiment of the present disclosure, any of a sound generating device having the first structure and a sound generating device having the second structure may be applied. Hereinafter, the second structure will be described for example.

FIG. 6A is a cross-sectional view of a sound generating device 1300 according to another embodiment of the present disclosure. FIG. 6B is a rear view of the sound generating device 1300 according to another embodiment of the present disclosure.

With reference to FIG. 6A, the sound generating device 1300 according to another embodiment of the present disclosure may include a magnet 1220 on a plate 1210, a center pole 1230 on the magnet 1220, a bobbin 1250 near the magnet 1220 and the center pole 1230, and a coil 1260 wound around the bobbin 1250.

For example, the magnet 1220 may be on the plate 1210, and the center pole 1230 may be on the magnet 1220. The center pole 1230 may be referred to as "pole pieces." Alternatively, pole pieces may be further included on the center pole 1230. The bobbin 1250 may surround the magnet 1220 and the center pole 1230, and the coil 1260 may be wound around the bobbin 1250. A frame 1240 may be disposed outside the plate 1210. A damper 1270 may be between the frame 1240 and the bobbin 1250. The damper 1270 may be referred to as an "edge," but the term is not limited thereto. The plate 1210 may be referred to as a "yoke," but the term is not limited thereto.

The display panel 100 may be attached on the bobbin 1250 of the sound generating device 1300 using a first adhesive member. The first adhesive member may include a double-sided tape, a single-sided tape, an adhesive, a bond, and/or the like, but is not limited thereto. The first adhesive member may be in a portion where the bobbin 1250 of the sound generating device 1300 is attached on the display panel 100, but is not limited thereto. For example, the first adhesive member may be on a whole rear surface of the display panel 100. Or, for example, the first adhesive member may be on a whole surface between the display panel 100 and the sound generating device 1300.

A heat dissipation member may be further included on a rear surface of the display panel 100, for decreasing heat occurring when a sound generating device 1300 is vibrating. For example, the heat dissipation member may be on the rear surface of the display panel 100 using a second adhesive member. For example, the heat dissipation member may be between the first adhesive member and the rear surface of the display panel 100 using a second adhesive member. The heat dissipation member may be configured to cover the sound generating device 1300 or to have a size that is greater than that of the sound generating device 1300, and may have a polygonal plate shape or a circular plate shape having a certain thickness, but is not limited thereto. For example, the heat dissipation member may be a heat dissipation sheet or a heat dissipation tape formed of a metal material that is high in thermal conductivity, such as aluminum (Al), copper (Cu), or silver (Ag) and an alloy thereof, but is not limited thereto. Accordingly, because the heat dissipation member is provided, an influence of heat on the image quality of the display panel 100 occurring when the sound generating device is vibrating may be reduced.

As described above with reference to FIG. 5, a supporting member is connected to a plate by a screw. In the present embodiment, to solve a problem where the stiffness of a sound generating device increases, the plate may not be fixed to the supporting member. In the present embodiment, the sound generating device may be fixed to the supporting member without the plate being fixed to the supporting member, e.g., by a screw, in order to decrease stiffness. For example, the plate may be spaced apart from the supporting member, and a structure may be between the supporting member and the sound generating device so that the sound generating device is fixed to the supporting member.

With reference to FIGS. 6A and 6B, the supporting member 300 and the plate 1210 of the sound generating device 1300 may be spaced apart from each other, and a structure between the plate 1210 and the supporting member 300 may be, for example, a connection part 1280. For example, the connection part 1280 may be between the plate 1210 and the supporting member 300. The connection part 1280 may be on one same plane between the plate 1210 and the supporting member 300. The connection part 1280 may include metal or plastic, but is not limited thereto. For example, the connection part 1280 may provide elasticity to the plate 1210 based on the vibration of the sound generating device 1300. Furthermore, the connection part 1280 may provide elasticity to the plate 1210 to decrease stiffness, and may reduce a resonance frequency to improve a sound of a low-pitched sound band of the sound generating device 1300. This will be described below with reference to Equation (1). A resonance frequency "fo" of a vibration generated by the sound generating device 1300 may be determined as in the following Equation (1).

$$f_0 = \frac{1}{2\pi}\sqrt{\frac{k}{m}}$$ [Equation 1]

Here, k denotes a stiffness of an object, and m denotes a mass of the object. For example, the sound generating device 1300 may decrease the stiffness 'k' of the object or may increase the mass 'm' of the object, based on Equation (1), thereby improving a sound of a low-pitched sound band. The connection part 1280 may decrease the stiffness of the sound generating device 1300 to lower a resonance frequency, thereby improving a sound of a low-pitched sound band of the sound generating device 1300. As another example, the sound generating device 1300 may decrease the mass 'm' of the object and may more decrease the stiffness 'k' of the object than an increase rate of the mass 'm', thereby decreasing the resonance frequency.

A coupling member 1310 may be a lower portion of or under the supporting member 300. The coupling member 1310 may include a screw 1320 and a nut 1330. The nut 1330 may be, for example, a self-clinching nut. Examples of the self-clinching nut may include PEM® nut, and the present embodiment is not limited thereto. The nut 1330 may be fastened to the supporting member 300 in a press-fitting type, but the present embodiment is not limited thereto. The sound generating device 1300 may be coupled to the supporting member 300 by the coupling member 1310. The connection part 1280 may be connected to the screw 1320.

With reference to FIG. 6A, the connection part 1280 may be between the coupling member 1310 and the frame 1240. For example, the connection part 1280 may extend from an outer portion of a lower portion of the frame 1240 to the screw 1320. Therefore, the connection part 1280 may stably support the plate 1210 surrounded by the frame 1240 and may provide elasticity to the plate 1210 to decrease the stiffness of the sound generating device 1300.

The frame 1240 may have a circular shape, a tetragonal (e.g., quadrilateral) shape, or a corner-rounded tetragonal (e.g., quadrilateral) shape, but is not limited thereto. When the frame 1240 has a tetragonal (e.g., quadrilateral) shape or a corner-rounded tetragonal (e.g., quadrilateral) shape, a lower portion of the frame 1240 may have a tetragonal (e.g., quadrilateral) shape having four corners or a corner-rounded tetragonal (e.g., quadrilateral) shape, and the connection part 1280 may be between the screw 1320 and each of corners of the frame 1240. For example, the connection part 1280 may be between the screw 1320 and each of four corners of the frame 1240. The connection part 1280 may be near (for example, connected to) the frame 1240 along a shape of the frame 1240, and the connection part 1280 near the frame 1240 may be disposed between a plurality of screws 1320 and the frame 1240. For example, when the frame 1240 has a tetragonal (e.g., quadrilateral) shape or a corner-rounded tetragonal (e.g., quadrilateral) shape, the connection part 1280 may be near the frame 1240 along a tetragonal (e.g., quadrilateral) shape or a corner-rounded tetragonal (e.g., quadrilateral) shape of the frame 1240, and the connection part 1280 near the frame 1240 may be between a plurality of screws 1320 and each of four corners of the frame 1240. The connection part 1280 may be outside (for example, spaced apart from) the frame 1240 along a shape of the frame 1240, and the connection part 1280 outside the frame 1240 may be disposed between the screws 1320 outside the frame 1240. For example, when the frame 1240 has a tetragonal (e.g., quadrilateral) shape or a corner-rounded tetragonal (e.g., quadrilateral) shape, the connection part 1280 may be outside the frame 1240 along a tetragonal (e.g., quadrilateral) shape or a corner-rounded tetragonal (e.g., quadrilateral) shape of the frame 1240, and the connection part 1280 disposed outside the frame 1240 may be between the screws 1320 correspond to each of the four corners of the frame 1240. However, the present embodiment is not limited thereto, and the connection part 1280 may be in or connected to a portion other than the corners of the frame 1240. For example, when the frame 1240 has a tetragonal (e.g., quadrilateral) shape or a corner-rounded tetragonal (e.g., quadrilateral) shape, the connection part 1280 may be between the frame 1240 and the coupling member 1310, and for example, the connection part 1280 may be disposed at the whole portion between the frame 1240 and the coupling member 1310. For example, when the frame 1240 has a circular shape, the connection part 1280 may be between the frame 1240 and the coupling member 1310, and for example, the connection part 1280 may be disposed at the whole portion between the frame 1240 and the coupling member 1310. A connection part 1280 between each of the four corners of the frame 1240 and the screw 1320 and a connection part 1280 outside the frame 1240 may be provided as one body. For example, the connection part 1280 disposed between each of the four corners of the frame 1240 and the screw 1320 and the connection part 1280 outside the frame 1240 may be configured as one body through a laser process. However, the present embodiment is not limited thereto, and the connection part 1280 may be formed through a punching process using laser, etching, and/or molding. Therefore, because the connection part 1280 is provided in plurality, a supporting force applied to the frame 1240 may be complemented, and the plate 1210 surrounded by the frame 1240 may be stably supported, thereby providing elasticity to the plate 1210 to decrease the stiffness of the sound generating device 1300. And, the connection part 1280 may provide elasticity to the plate 1210 based on the vibration of the sound generating device 1300.

With reference to FIG. 6A, a partition 700 may be between the supporting member 300 and the display panel 100. The partition 700 may be an air gap or a space where a sound is generated when the display panel 100 vibrates. In comparison with FIG. 5, a vibration of the sound generating device 1300 may vibrate a whole portion of the sound generating device 1300, and thus, a sound output characteristic of the sound generating device 1300 may be more enhanced. For example, using the plate 1210, the magnet 1220, the center pole 1230, the frame 1240, the bobbin 1250, the coil 1260, and the damper 1270, the sound generating device 1300 may vibrate the display panel 100 to output sound, and thus, a sound output characteristic thereof may be more enhanced, thereby providing a display apparatus with an enhanced sound output characteristic of a low-pitched sound band.

Figure 7:
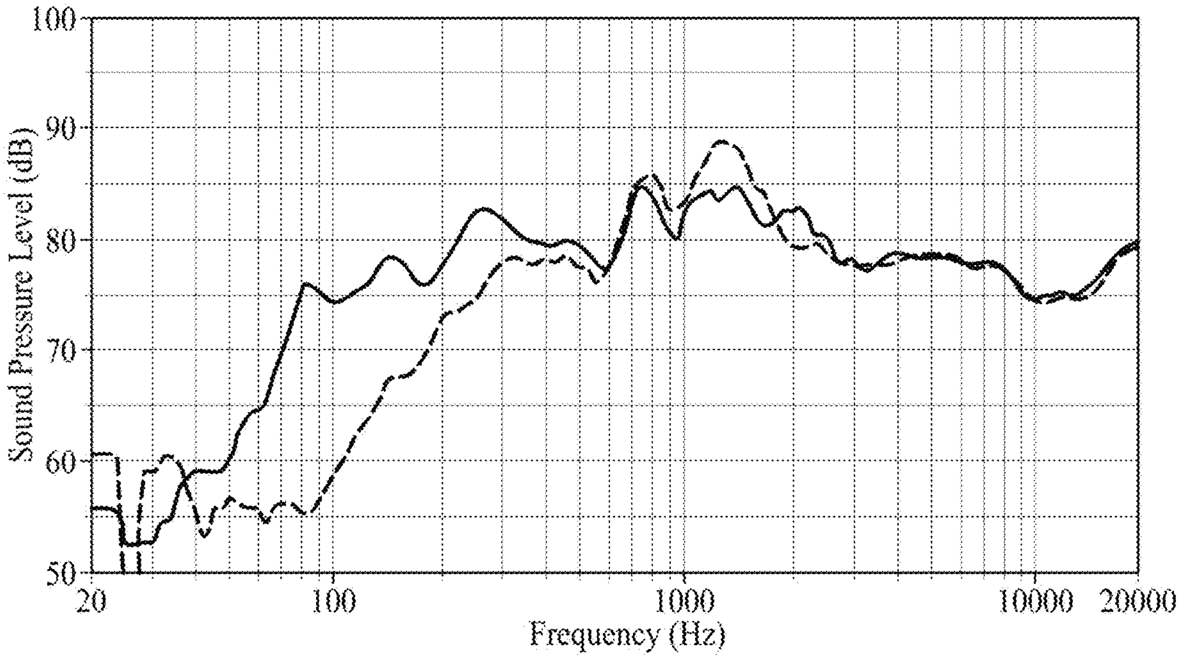
FIG. 7 illustrates a sound output characteristic according to an embodiment of the present disclosure.

FIG. 7 illustrates a sound output characteristic according to an embodiment of the present disclosure.

In FIG. 7, a dotted line represents a sound output characteristic of the sound generating device of FIG. 5, and a solid line represents a sound output characteristic of the sound generating device of FIG. 6. Also, the abscissa axis (x-axis) represents a frequency in hertz (Hz), and the ordinate axis (y-axis) represents a sound pressure level (SPL) in decibels (dB).

With reference to FIG. 7, in the sound generating device according to an embodiment of the present disclosure, it may be seen that a sound pressure level is enhanced in a region of 200 Hz or less corresponding to a low-pitched sound band compared to the dotted line. For example, a sound pressure level shown by the dotted line is 60 dB in a frequency of 100 Hz, and a sound pressure level of the sound generating device according to an embodiment of the present disclosure is 75 dB. Thus, it may be seen that a sound pressure level is enhanced by about 15 dB. Therefore, in the sound generating device according to an embodiment of the present disclosure, it may be seen that a sound pressure level of a low-pitched sound band is enhanced. Furthermore, in the sound generating device according to an embodiment of the present disclosure, it may be seen that a sound pressure level is enhanced in a region of 200 Hz to 3 kHz or less corresponding to a middle-pitched sound band. Here, the middle-pitched sound band may be 200 Hz to 3 kHz, a high-pitched sound band may be 3 kHz or more, and the low-pitched sound band may be 200 Hz or less. However, the present embodiment is not limited thereto.

Figure 8A:
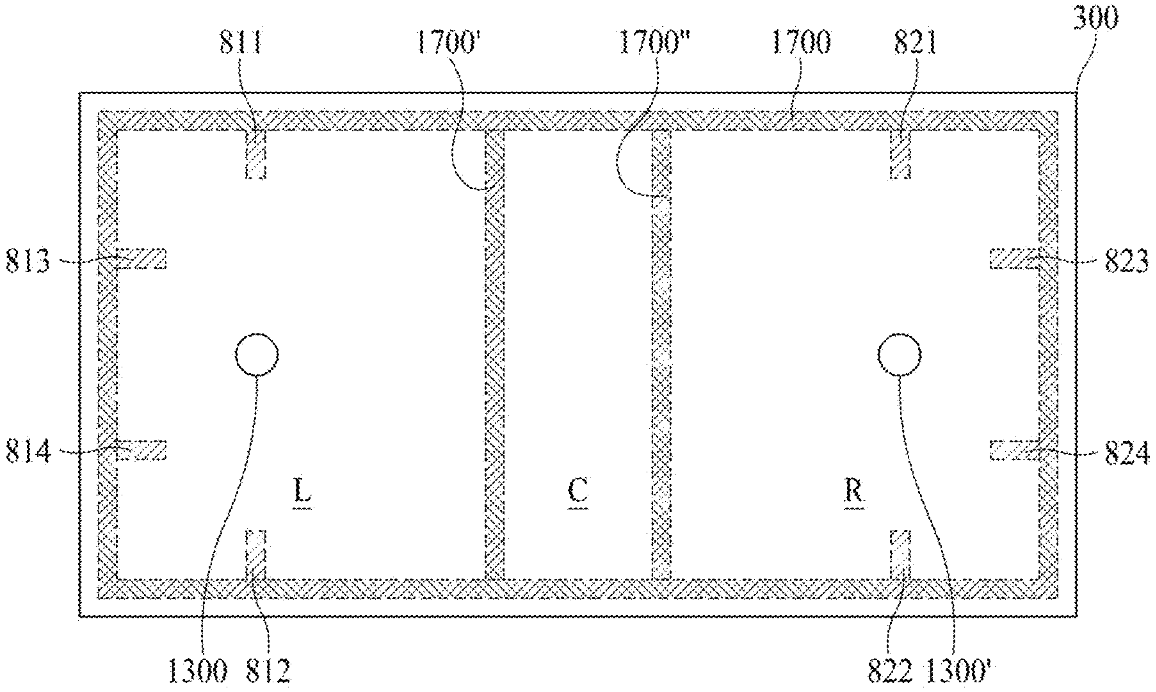
FIGS. 8A to 8C illustrate a sound generating device and a partition in a display apparatus according to an embodiment of the present disclosure.
Figure 8B:
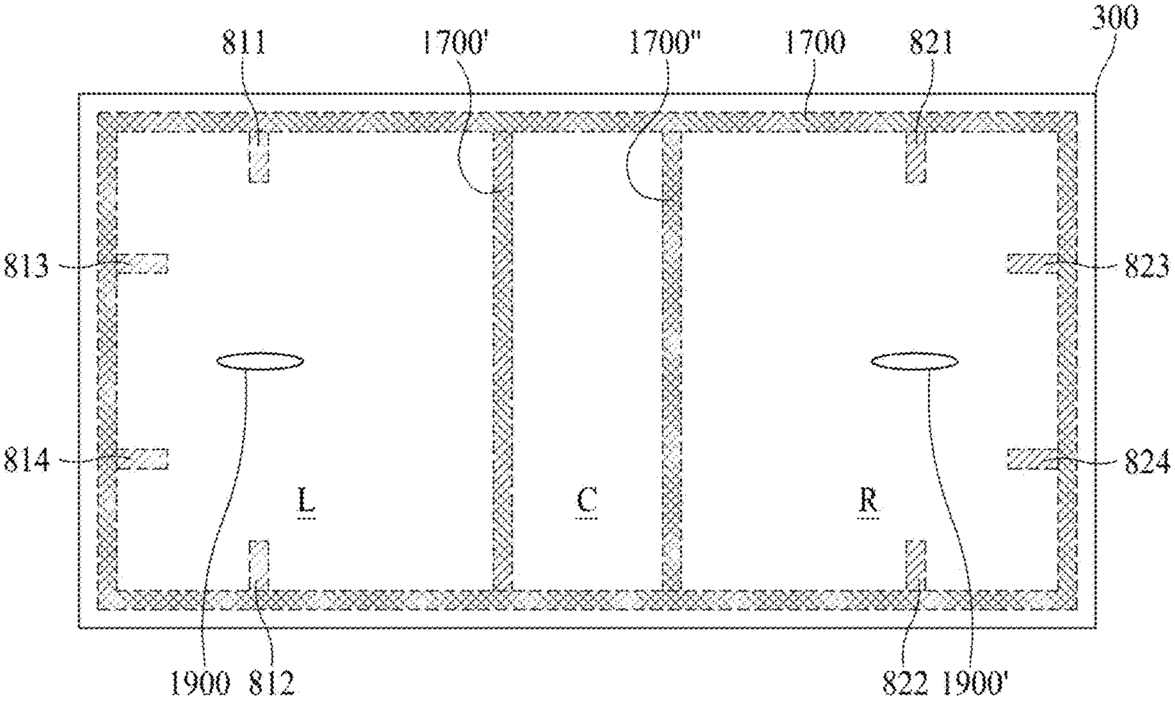
Figure 8C:
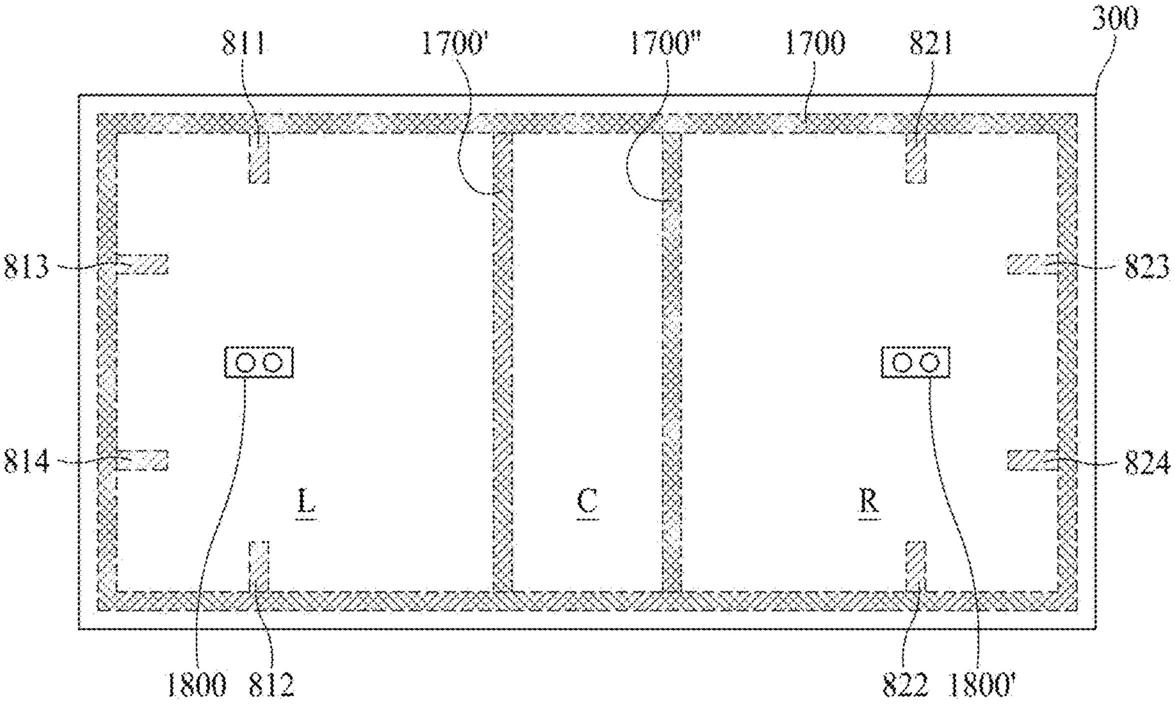

FIGS. 8A to 8C illustrate a sound generating device and a partition in a display apparatus according to an embodiment of the present disclosure.

With reference to FIGS. 8A to 8C, a display panel 100 may include a first region L, a second region R, and a third region C. The first region L may be a left region of a rear surface of the display panel 100, the second region R may be a right region of the rear surface of the display panel 100, and the third region C may be a center region of the rear surface of the display panel 100. The left region and the right region may be symmetrical. For convenience, description will be given below with reference to the illustration. At least one sound generating device may be in at least one of the first region L, the second region R, and the third region C. For example, a first sound generating device 1300 may be in the first region L of the rear surface of the display panel 100, and a second sound generating device 1300' may be in the second region R of the rear surface of the display panel 100. The at least one sound generating device may include one or more of a circular sound generating device, an elliptical sound generating device, and a pair of sound generating devices. The at least one sound generating device may vibrate the display panel 100 to generate a sound. For example, the at least one sound generating device may directly vibrate the display panel 100 to generate sound. Furthermore, for example, the sound generating device may generate a sound of the low-pitched sound band, the middle-pitched sound band, and the high-pitched sound band and may output a stereo sound.

With reference to FIG. 8A, the first sound generating device 1300 and the second sound generating device 1300' may be respectively in the first region L and the second region R of the display panel 100. The first sound generating device 1300 may be in the first region L of a rear surface of the display panel 100, and the second sound generating device 1300' may be in the right region R of the rear surface of the display panel 100. As described above with reference to FIGS. 6A and 6B, the first sound generating device 1300 and the second sound generating device 1300' may be coupled to a supporting member 300.

Therefore, the first sound generating device 1300 may be in the first region L, which is the left region of the rear surface of the display panel 100 and may vibrate the first region L of the display panel 100, and the second sound generating device 1300' may be in the second region R, which is the right region of the rear surface of the display panel 100 and may vibrate the second region R of the display panel 100. The first sound generating device 1300 and the second sound generating device 1300' may receive different vibration signals and may be independently driven. For example, the first sound generating device 1300 may generate a sound using the first region L of the display panel 100 as a vibration plate, and the second sound generating device 1300' may generate sound using the second region R of the display panel 100 as a vibration plate. For example, the first sound generating device 1300 and the second sound generating device 1300' may directly vibrate the display panel 100 to generate sound. Such descriptions may be identically applied to FIGS. 8B to 11C.

In FIG. 8A, the first sound generating device 1300 and the second sound generating device 1300' may be configured as a circular sound generating device. The circular sound generating device is as described above with reference to FIGS. 6A and 6B, and thus, its detailed description is omitted.

In FIG. 8B, a first sound generating device 1900 and a second sound generating device 1900' may be configured as an oval sound generating device. The sound generating device described above with reference to FIGS. 6A and 6B may be applied to the oval sound generating device, and a bobbin may be configured in an oval shape. When the oval sound generating device is applied, a sound output characteristic of a middle-high-pitched sound band may be more enhanced. Description given above with reference to FIGS. 6A and 6B may be applied to a coupling structure of the first and second sound generating devices 1900 and 1900' and a supporting member.

In FIG. 8C, a first sound generating device 1800 and a second sound generating device 1800' may be configured as a pair of sound generating devices. The sound generating device described above with reference to FIGS. 6A and 6B may be applied to the pair of sound generating devices. For example, the pair of sound generating devices may be configured with two sound generating devices described above with reference to FIGS. 6A and 6B, and the two sound generating devices may be disposed adjacent to each other. Description given above with reference to FIGS. 6A and 6B may be applied to a coupling structure of the first and second sound generating devices 1800 and 1800' and a supporting member.

A partition and a pad will be described below with reference to FIG. 8A, and their descriptions may be identically applied to FIGS. 8B and 8C.

With reference to FIGS. 8A to 8C, a first partition 1700 may be between a display panel and a supporting member 300. For example, the first partition 1700 may be between a rear surface of the display panel and an upper surface of the supporting member 300. Also, the first partition 1700 may be on the supporting member 300. For example, the first partition 1700 may be in an edge or periphery of the supporting member 300 or an edge or periphery of an upper surface of the supporting member 300. Also, the first partition 1700 may be in an edge or periphery of the display panel. For example, the first partition 1700 may be in an edge or periphery of the rear surface of the display panel. Also, the first partition 1700 may be a whole region of the rear surface of the display panel or the supporting member 300. Also, the first partition 1700 may be a whole region of four outer sides of the supporting member 300 or the whole region of the rear surface of the display panel.

With reference to FIG. 8A, at least two partitions (for example, a second partition 1700' and a third partition 1700") may be between the first sound generating device 1300 and the second sound generating device 1300'. For example, the second partition 1700' may be between the first region L and the third region C, and the third partition 1700" may be between the second region R and the third region C.

The first partition 1700, the second partition 1700' and the third partition 1700" may be an air gap or a space where a sound is generated when the display panel 100 vibrates. An air gap or a space which generates or transfers sound may be referred to as a "partition." A partition may be referred to as an "enclosure" or a "baffle," but the term is not limited thereto. Also, the first partition 1700, the second partition 1700' and the third partition 1700" may have a sealed structure, or may have an unsealed structure.

The first partition 1700, the second partition 1700' and the third partition 1700" may prevent a sound from being leaked to the outside through each side surface of a display panel 100, and thus, the sound output from the first sound generating device 1300 and the second sound generating device 1300' may be output to only a forward region in front of the display panel 100, thereby enhancing a sound output characteristic.

The first partition 1700, the second partition 1700' and the third partition 1700" may be between the display panel 100 and the supporting member 300. For example, the first partition 1700, the second partition 1700' and the third partition 1700" may be between a rear surface of the display panel 100 and an upper surface of the supporting member 300. Also, the first partition 1700, the second partition 1700' and the third partition 1700" may be in the supporting member 300. Furthermore, the first partition 1700, the second partition 1700' and the third partition 1700" may be in the display panel 100. In FIGS. 8A to 11C, an example where the first partition 1700, the second partition 1700' and the third partition 1700" are disposed in the supporting member 300 will be described.

The second partition 1700' and the third partition 1700" may separate a left sound and a right sound respectively generated by the first sound generating device 1300 and the second sound generating device 1300'. Also, a vibration of the display panel 100 performed in a space or an air gap defined as the second partition 1700' and the third partition 1700" may be attenuated or absorbed by a center of the display panel 100, and thus, a sound generated in the left region may be prevented from being transferred to a space of the right region. Therefore, because the display apparatus according to an embodiment of the present disclosure includes the second partition 1700' and the third partition 1700", the left sound and the right sound may be separated from each other, and thus, a sound output characteristic may be enhanced. Also, the first sound generating device 1300 and the second sound generating device 1300' may output a sound of the middle-pitched sound band and a sound of the high-pitched sound band, and may output a stereo sound by separating the left and right sounds, thereby providing a display apparatus having a 2.1-channel sound output characteristic.

The first sound generating device 1300 may be in the first region L, which is the left region, the second sound generating device 1300' may be in the second region R, which is the right region, and a sound generating device may not be in the third region C, which is a center region. Accordingly, the degradation in sound quality caused by interference in the first region L and the second region R may be reduced. Also, a sound output characteristic of the low, middle, and high-pitched sound bands may be more enhanced. Furthermore, an area of the third region C may be adjusted to be less than an area of the first region L and an area of the second region R. Accordingly, a sound of the low-pitched sound band may be enhanced. Also, the third region C may decrease the degradation in sound quality caused by interference in the first region L and the second region R. Accordingly, a sound of the low, middle, and high-pitched sound bands may be enhanced. Descriptions of the first partition 1700, the second partition 1700', and the third partition 1700" may be identically applied to FIGS. 8B to 11C.

In FIGS. 8A to 11C, the first partition 1700 may inc the adhesive member described above with reference to FIG. 1. Also, the adhesive member for attaching the supporting member on the display panel may be further provided between the display panel and the supporting member described above with reference to FIG. 1. For example, the adhesive member may be further in an edge or periphery of the display panel or an edge or periphery of the supporting member.

FIGS. 8A to 11C illustrate an example where the sound generating device is in the side of the left region or the right region without being disposed in a center of the left region (the first region L) or the right region (the second region R) of the display panel 100, but the present embodiment is not limited thereto. In other embodiments, the sound generating device may be in the center of the left region (the first region L) or the right region (the second region R) of the display panel 100. Alternatively, the sound generating device may be asymmetrically in the first region L and the second region R of the display panel 100. A stereo sound characteristic may be more enhanced in a case where the sound generating device is disposed in the side of the left region or the right region, than in a case where the sound generating device is disposed in the center of the left region (the first region L) or the right region (the second region R) of the display panel 100.

A partition having a double structure including two or more partitions may be between the first sound generating device 1300 and the second sound generating device 1300'. For example, a left region and a right region of a display panel may have the same vibration characteristic when realizing a mono sound where the left and right regions output the same sound, and for this reason, a resonance phenomenon or an interference phenomenon may be increased and/or maximized in a certain frequency band, causing the reduction in sound pressure. Therefore, the partition may be configured in a structure including two or more partitions, for decreasing an influence of a sound characteristic caused by a resonance frequency difference of a middle-high-pitched sound, which occurs in the first sound generating device in the first region L (the left region) and the second sound generating device in the second region R (the right region). When three or more partitions are between the first sound generating device 1300 and the second sound generating device 1300', a sound pressure is prevented from being reduced even when sound interference in the left and right regions increases, thereby preventing a sound output characteristic from being discontinuously recognized.

Therefore, two or more partitions may be in a center region of a display panel, thereby decreasing an influence of a sound characteristic caused by a resonance frequency difference between a middle-pitched sound and a high-pitched sound in a left region and a right region of the display panel. Also, a partition may be between two sound generating devices, and thus, a left sound and a right sound may be separated from each other, thereby enhancing a stereo characteristic of a sound. Also, a different sound of the low-pitched sound, the middle-pitched sound band, and a sound of the high-pitched sound band may be output by the two sound generating devices.

A substrate configuring the display panel 100 may use a glass substrate. In order to implement a display apparatus having a thin thickness, a thickness of the glass substrate may be thinly adjusted. For example, using the glass substrate having a thickness thinned from 0.7 mm to 0.5 mm, the display apparatus may be more thinly implemented.

When the thickness of the substrate is thinned, and when the partition is provided on the rear surface of the display panel 100 or an upper surface of a supporting member, a problem may occur in which the display panel 100 is not flat and a step height may be formed in the display panel 100, due to the partition when the supporting member is attached on the display panel 100. For example, a problem where the display panel 100 may be not flat and a screen may be unevenly seen may occur. Such a phenomenon may be referred to as an uneven phenomenon or a wave phenomenon of the display panel 100, and the term is not limited thereto. An example where the partition is disposed in the supporting member will be described, and even when the partition is disposed on the rear surface of the display panel, a wave phenomenon may occur. Therefore, to decrease a wave phenomenon, the first partition 1700 may be disposed along a shape of the display panel 100. For example, the first partition 1700 may have a tetragonal (e.g., quadrilateral) shape, but is not limited thereto. In other embodiments, a shape of the first partition 1700 may be modified based on a shape of the display panel 100. Also, if the display panel 100 is a curved display panel having a curve shape or the like, the first partition 1700 may have a curved shape or a curve shape. Accordingly, the first partition 1700 may be disposed along a shape of the display panel 100, and thus, a degree to which the display panel 100 is pulled is reduced in a process of attaching the supporting member on the display panel 100, thereby preventing the wave phenomenon.

A sound wave that is generated when a display panel vibrates by a vibration generating device may be spread radially from a center of the vibration generating device and may travel. The sound wave may be referred to as a progressive wave. The progressive wave may be reflected by one side of a partition to generate a reflected wave, and the reflected wave may travel in a direction opposite to the progressive wave. The reflected wave overlaps and interferes in the progressive wave and does not travel, thereby generating a standing wave which stands at a certain position. A sound pressure is reduced by the standing wave, and for this reason, a sound output characteristic is reduced.

If the first partition 1700 is provided, it may not be able to control the peak and the dipping caused by the standing wave. Thus, the first partition 1700 may have a structure for controlling the peak and the dipping caused by the standing wave. Here, the peak may be a phenomenon where a sound pressure bounces in a specific frequency, and the dipping may be a phenomenon where generating of a specific frequency is suppressed, and thus, a low sound pressure is generated. A sound output characteristic of the display apparatus may be reduced by the peak or the dipping. Such a structure may be configured to prevent the wave phenomenon and to enable the peak and the dipping caused by the standing wave to be easily controlled. Therefore, a pad may be in the first partition 1700 so as to decrease a peak and dipping that are caused by a standing wave occurring in a lengthwise direction of the first and second sound generating devices 1300 and 1300'. Therefore, the degree of reduction in sound pressure caused by the standing wave generated by interference between the reflected wave and the progressive wave may be reduced. Also, the standing wave that causes the sound pressure to be reduced is greatly generated at a position at which a level of the progressive wave and the reflected wave is high.

Accordingly, the pad may be disposed at a position at which a level of a sound wave transferred from the vibration generating device is highest. For example, the pad may be provided on one or more sides of the first partition 1700. The pad may be provided on one or more sides, which a strongest sound wave reaches, of four sides of the first partition 1700, and may be configured to face the first and second sound generating devices 1300 and 1300'. A partition and a pad disposed in a supporting member will be described with reference to FIGS. 8A to 11C, but the present disclosure is not limited thereto. Even when a partition and a pad are disposed in the rear surface of the display panel, the same descriptions may be applied.

A shape of a pad may be implemented to prevent the wave phenomenon from occurring when the display panel 100 is pulled in a process of attaching the pad, disposed on the supporting member, to the display panel 100. Alternatively, a shape of the pad may be implemented to prevent the wave phenomenon from occurring when the supporting member is pulled in a process of attaching the pad, disposed on the display panel 100, to the supporting member. For example, a shape of the pad may be implemented to prevent the wave phenomenon and to enable the peak and the dipping caused by the standing wave to be easily controlled. The pad has been implemented in a tetragonal (e.g., quadrilateral) shape or a corner-rounded tetragonal (e.g., quadrilateral) shape through various experiments.

With reference to FIG. 8A, at least one pad may be provided on at least one side of the first partition 1700, for decreasing the peak and the dipping caused by the standing wave. For example, the first partition 1700 may include a first side and a second side vertical to the first side, and at least one first pad 811 and at least one seventh pad 821 may be on the first side. The at least one first pad 811 may be in the first region L, and the at least one seventh pad 821 may be in the second region R. The first pad 811 and the seventh pad 821 may be provided as one or as a plurality. The first side may be a widthwise direction of the display panel 100 or the supporting member 300, and the second side may be a lengthwise direction of the display panel 100 or the supporting member 300. The widthwise direction and the lengthwise direction may be used interchangeable.

At least one second pad 812 may be disposed to face the at least one first pad 811. For example, the at least one second pad 812 may be on a side facing the at least one first pad 811. The at least one second pad 812 may be in the first region L. The at least one second pad 812 may be provided as one or as a plurality.

At least one eighth pad 822 may be disposed to face the at least one seventh pad 821. For example, the at least one eighth pad 822 may be in a side facing the at least one seventh pad 821. The at least one eighth pad 822 may be in the second region R. The at least one eighth pad 822 may be provided as one or as a plurality.

The second pad 812 and the eighth pad 822 may be further on a side facing the first side of the first partition 1700. The second pad 812 may be on a side facing the first side of the first partition 1700 in the first region L, and the eighth pad 822 may be on a side facing the first side of the first partition 1700 in the second region R. The second pad 812 may be provided to face the first pad 811. The eighth pad 822 may be provided to face the seventh pad 821. The second pad 812 and the eighth pad 822 may be provided as one or as plurality.

The at least one first pad 811 and the at least one second pad 812 may be provided to face the first sound generating device 1300. The at least one seventh pad 821 and the at least one eighth pad 822 may be provided to face the second sound generating device 1300'. For example, the first pad 811 and the second pad 812 may be in the first region L to face the first sound generating device 1300, and the seventh pad 821 and the eighth pad 822 may be in the second region R to face the second sound generating device 1300'. Therefore, the pads 811, 812, 821, and 822 may decrease the peak or the dipping caused by the standing wave which occurs in a lengthwise direction of the first sound generating device 1300 and the second sound generating device 1300' and may allow a vibration to laterally transferred, thereby enhancing a sound output characteristic.

A third pad 813, a fourth pad 814, a ninth pad 823, and a tenth pad 824 may be further in the second side of the first partition 1700. The third pad 813, the fourth pad 814, the ninth pad 823, and the tenth pad 824 may be provided as one or as a plurality in one or more sides of the first partition 1700. The third pad 813, the fourth pad 814, the ninth pad 823, and the tenth pad 824 may be in at least one of a first region L and a second region R. For example, the third pad 813 and the fourth pad 814 may be in the first region L, and the ninth pad 823 and the tenth pad 824 may be in the second region R. For example, the third pad 813 and the fourth pad 814 may be disposed to be symmetrical with respect to the first sound generating device 1300, and the ninth pad 823 and the tenth pad 824 may be disposed to be symmetrical with respect to the second sound generating device 1300'.

When a pad is formed of the same material as that of the first partition 1700, the wave phenomenon may occur at a position at which the pad is disposed. The occurrence of the wave phenomenon has been recognized because, when an adhesive force of the first partition 1700 is the same as that of the pad, the display panel is more pulled at the position at which the pad is disposed. For example, the pad may be formed of a material for decreasing a degree to which the display panel 100 is pulled in a process of attaching the supporting member 300 to the display panel 100. The pad in the first partition 1700 may be formed of a material for decreasing a degree to which the display panel 100 is pulled in a process of contacting the display panel 100. When a pad is formed of a material differing from that of the first partition 1700, a wave phenomenon may decrease.

Therefore, the at least one first pad 811 may be formed of a material differing from that of the first partition 1700. And, in an example, the first partition 1700 may be formed of a double-sided tape. In comparison with a single-sided tape, when the first partition 1700 is formed of the double-sided tape, the wave phenomenon may not be reduced, but an adhesive force between the display panel and the supporting member is enhanced and sound quality is enhanced.

The at least one first pad 811 may be formed of a material differing from that of at least one of the first partition 1700, the second partition 1700', and the third partition 1700". The at least one first pad 811 or the at least one second pad 812 may be formed of a material differing from that of the first partition 1700. The at least one first pad 811 or the at least one second pad 812 may be formed of a material differing from that of at least one of the first partition 1700, the second partition 1700', and the third partition 1700". The at least one second pad 812 may be formed of the same material as that of the at least one first pad 811. The at least one third pad 813 or the at least one fourth pad 814 may be formed of a material differing from that of the first partition 1700. The at least one third pad 813 or the at least one fourth pad 814 may be formed of a material differing from that of at least one of the first partition 1700, the second partition 1700', and the third partition 1700". The at least one third pad 813 or the at least one fourth pad 814 may be formed of the same material as that of the at least one first pad 811.

One of a second partition 1700' and a third partition 1700" may be formed of the same material as that of the first partition 1700. For example, the second partition 1700' or the third partition 1700" may be formed of a double-sided tape or a double-sided foam pad. The double-sided tape or the double-sided foam pad may include a foam material that absorbs an impact when contacting the display panel 100. When the double-sided tape or the double-sided foam pad does not include the foam material, an undesired abnormal sound may occur due to contacting the display panel 100. For example, the first partition 1700 may be formed of a material having elasticity, which enables compression to be made to a certain degree. The first partition 1700 may be formed of polyurethane, polyolefin, polyethylene, and/or the like, but is not limited thereto. The second partition 1700' and the third partition 1700" may be formed of the same material as that of the first partition 1700. When the second partition 1700' and the third partition 1700" are formed of the same material as that of the first partition 1700, an adhesive force may be enhanced in a process of attaching the display panel 100 on the supporting member 300.

The at least one seventh pad 821 or the at least one eighth pad 822 may be formed of a material differing from that of the first partition 1700. The at least one seventh pad 821 or the at least one eighth pad 822 may be formed of a material differing from that of at least one of the first partition 1700, the second partition 1700', and the third partition 1700". The at least one seventh pad 821 or the at least one eighth pad 822 may be formed of the same material as that of the at least one first pad 811. The at least one eighth pad 822 may be formed of the same material as that of the at least one seventh pad 821.

The at least one ninth pad 823 or the at least one tenth pad 824 may be formed of a material differing from that of the first partition 1700. The at least one ninth pad 823 or the at least one tenth pad 824 may be formed of a material differing from that of at least one of the first partition 1700, the second partition 1700', and the third partition 1700". The at least one ninth pad 823 or the at least one tenth pad 824 may be formed of the same material as that of the at least one first pad 811. The at least one ninth pad 823 or the at least one tenth pad 824 may be formed of the same material as that of the at least one seventh pad 821.

The first to fourth pads 811 to 814 and the seventh to tenth pads 821 to 824 may be formed of a material differing from that of the first partition 1700. The first to fourth pads 811 to 814 and the seventh to tenth pads 821 to 824 may be formed of a material differing from that of the second partition 1700' or the third partition 1700". For example, the first to fourth pads 811 to 814 and the seventh to tenth pads 821 to 824 may be formed of a single-sided tape. The single-sided tape may include a foam material, which absorbs an impact when contacting the display panel 100. When the single-sided tape does not include the foam material, an undesired abnormal sound may occur due to contacting the display panel 100. For example, the single-sided tape may be formed of polyurethane, polyolefin, polyethylene, and/or the like, but is not limited thereto. When the first partition 1700, the first to fourth pads 811 to 814, and the seventh to tenth pads 821 to 824 are formed of different materials, the materials may be the same materials having different adhesive forces. Alternatively, the materials may differ and may have different adhesive forces, but are not limited thereto. In this case, a degree to which the display panel 100 is pulled may be reduced in a process of attaching the display panel 100 and the supporting member 300 on the first to fourth pads 811 to 814 and the seventh to tenth pads 821 to 824 disposed in the first partition 1700, thereby preventing the wave phenomenon.

Therefore, because one or more pads are provided on at least one side of a partition, the partition and the pads may be formed of different materials, and the wave phenomenon may decrease, thereby enhancing a sound output characteristic.

Figure 9A:
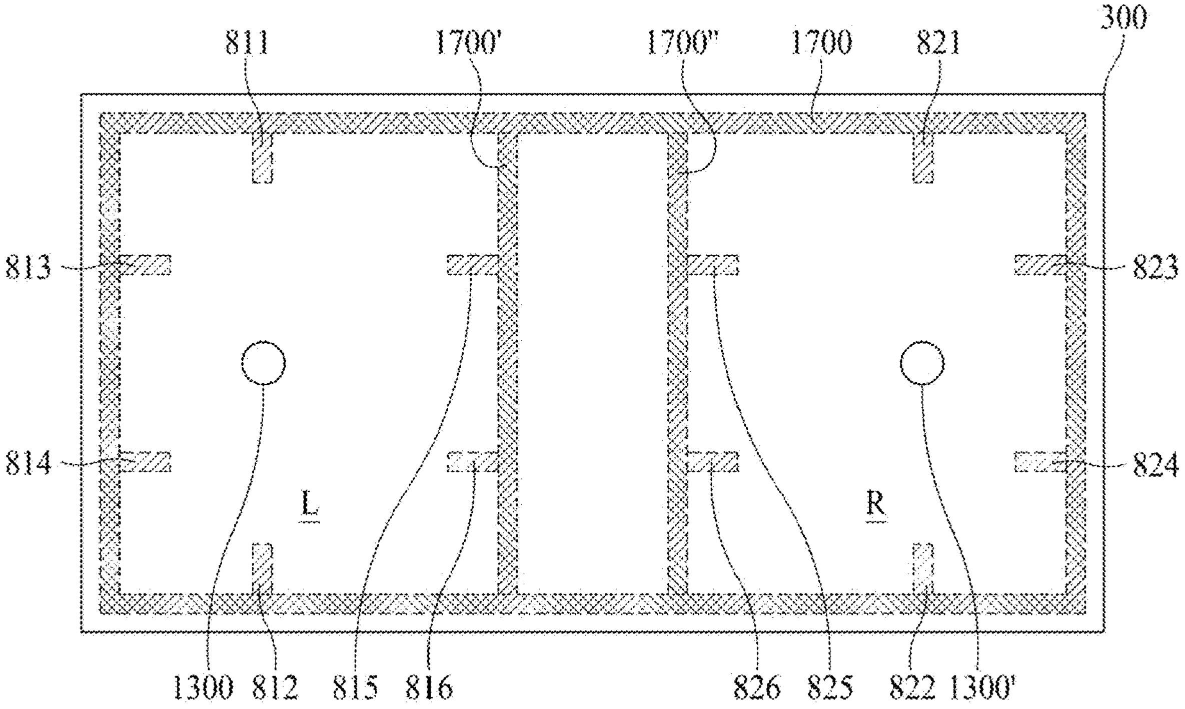
FIGS. 9A to 9C illustrate a sound generating device and a partition in a display apparatus according to another embodiment of the present disclosure.
Figure 9B:
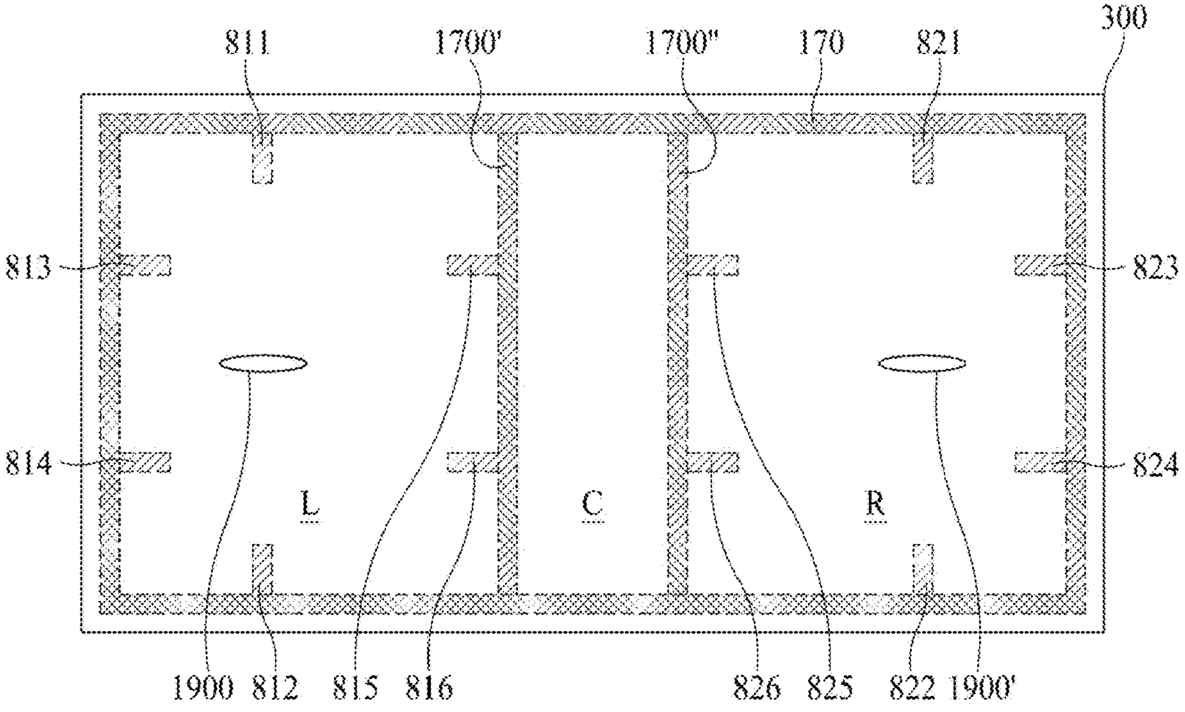
Figure 9C:
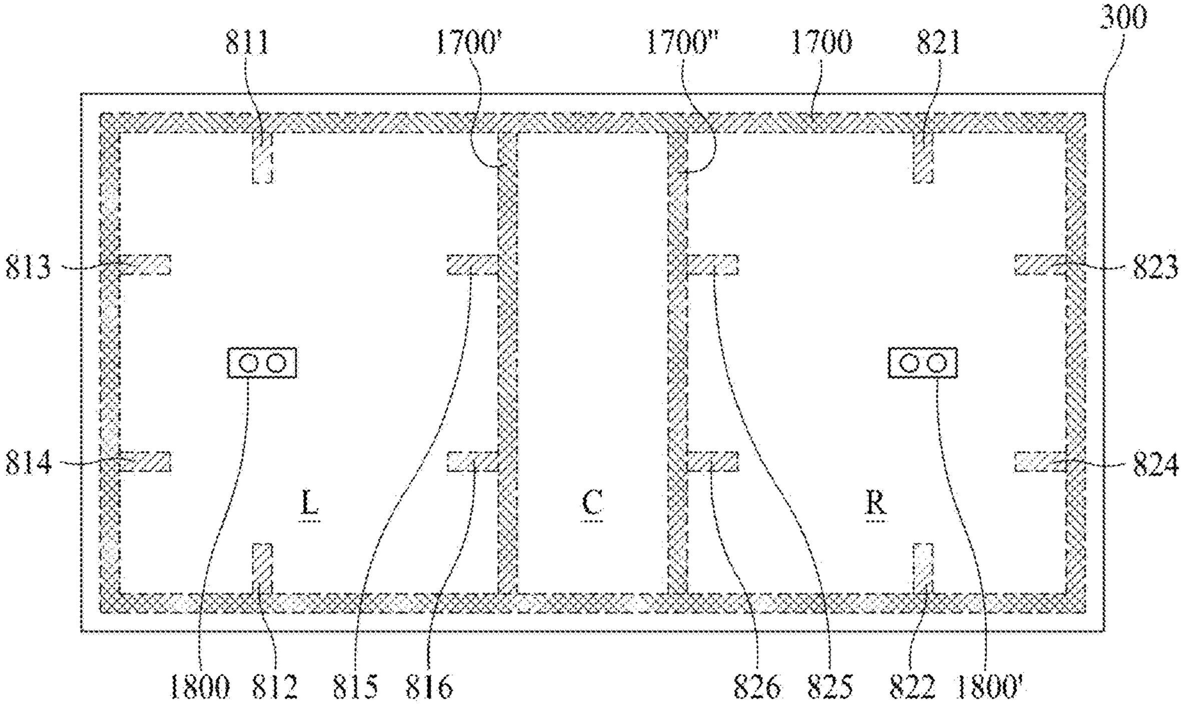

FIGS. 9A to 9C illustrate a sound generating device and a partition in a display apparatus according to another embodiment of the present disclosure.

In FIGS. 9A to 9C, the same descriptions as descriptions given above with reference to FIGS. 8A to 8C are omitted or will be briefly given below. For example, descriptions of a sound generating device and a pad are omitted or will be briefly given below. A partition and a pad will be described below with reference to FIG. 9A, and their descriptions may be identically applied to FIGS. 9B and 9C.

With reference to FIGS. 9A to 9C, a pad may be provided in at least one side of a first partition 1700 to decrease a peak and dipping, which are caused by a standing wave occurring in a lengthwise direction of the first and second sound generating devices. For example, the first partition 1700 may include a first side and a second side vertical to the first side, and a first pad 811 and a seventh pad 821 may be provided in the first side. A second pad 812 and an eighth pad 822 may be further provided on a side facing the first side of the first partition 1700. A third pad 813, a fourth pad 814, a ninth pad 823, and a tenth pad 824 may be in the second side of the first partition 1700. Descriptions of the first to fourth pads 811 to 814 and the seventh to tenth pads 821 to 824 are the same as descriptions given above with reference to FIGS. 8A to 8C, and thus, are omitted but will be simply given below.

With reference to FIG. 9A, at least one fifth pad 815, sixth pad 816, eleventh pad 825, and twelfth pad 826 may be further on a side facing the second side of the first partition 1700. For example, the fifth pad 815 and the sixth pad 816 may be in a side, facing the second side of the first partition 1700, of a first region L and may be on one side of a second partition 1700'. For example, the eleventh pad 825 and the twelfth pad 826 may be on a side, facing the second side of the first partition 1700, of a second region R and may be on one side of the third partition 1700". The fifth pad 815 and the sixth pad 816 may be provided to face the third pad 813 and the fourth pad 814. For example, the fifth pad 815 and the sixth pad 816 may be disposed to be symmetrical with respect to a first sound generating device 1300. The eleventh pad 825 and the twelfth pad 826 may be provided to face the ninth pad 823 and the tenth pad 824. For example, the eleventh pad 825 and the twelfth pad 826 may be disposed to be symmetrical with respect to a second sound generating device 1300'.

The at least one first pad 811 may be formed of a material differing from that of the first partition 1700. The at least one first pad 811 may be formed of a material differing from that of at least one of the first partition 1700, the second partition 1700', and the third partition 1700". The at least one first pad 811 or the at least one second pad 812 may be formed of a material differing from that of the first partition 1700. The at least one first pad 811 or the at least one second pad 812 may be formed of a material differing from that of at least one of the first partition 1700, the second partition 1700', and the third partition 1700". The at least one second pad 812 may be formed of the same material as that of the at least one first pad 811.

The at least one third pad 813 or the at least one fourth pad 814 may be formed of a material differing from that of the first partition 1700. The at least one third pad 813 or the at least one fourth pad 814 may be formed of a material differing from that of at least one of the first partition 1700, the second partition 1700', and the third partition 1700". The at least one third pad 813 or the at least one fourth pad 814 may be formed of the same material as that of the at least one first pad 811. The at least one fifth pad 815 or the at least one sixth pad 816 may be formed of a material differing from that of the first partition 1700. The at least one fifth pad 815 or the at least one sixth pad 816 may be formed of a material differing from that of at least one of the first partition 1700, the second partition 1700', and the third partition 1700". The at least one fifth pad 815 or the at least one sixth pad 816 may be formed of the same material as that of the at least one first pad 811.

The at least one seventh pad 821 or the at least one eighth pad 822 may be formed of a material differing from that of the first partition 1700. The at least one seventh pad 821 or the at least one eighth pad 822 may be formed of a material differing from that of at least one of the first partition 1700, the second partition 1700', and the third partition 1700". The at least one seventh pad 821 or the at least one eighth pad 822 may be formed of the same material as that of the at least one first pad 811. The at least one eighth pad 822 may be formed of the same material as that of the at least one seventh pad 821. The at least one ninth pad 823 or the at least one tenth pad 824 may be formed of a material differing from that of the first partition 1700. The at least one ninth pad 823 or at least one tenth pad 824 may be formed of a material differing from that of at least one of the first partition 1700, the second partition 1700', and the third partition 1700". The at least one ninth pad 823 or the at least one tenth pad 824 may be formed of the same material as that of the at least one seventh pad 821. The at least one ninth pad 823 or the at least one tenth pad 824 may be formed of the same material as that of the at least one seventh pad 821. The at least one eleventh pad 825 or the at least one twelfth pad 826 may be formed of a material differing from that of the first partition 1700. The at least one eleventh pad 825 or the at least one twelfth pad 826 may be formed of a material differing from that of at least one of the first partition 1700, the second partition 1700', and the third partition 1700". The at least one eleventh pad 825 or the at least one twelfth pad 826 may be formed of the same material as that of the at least one first pad 811. The at least one eleventh pad 825 or the at least one twelfth pad 826 may be formed of the same material as that of the at least one seventh pad 821.

The first to sixth pads 811 to 816 and the seventh to twelfth pads 821 to 826 may be formed of a material differing from that of the first partition 1700. The first to sixth pads 811 to 816 and the seventh to twelfth pads 821 to 826 may be formed of a material differing from that of the second partition 1700' or the third partition 1700". For example, the first to sixth pads 811 to 816 and the seventh to twelfth pads 821 to 826 may be formed of a single-sided tape. The single-sided tape may include a foam material, which absorbs an impact when contacting the display panel 100. When the single-sided tape does not include the foam material, an undesired abnormal sound may occur due to contacting the display panel 100. For example, the single-sided tape may be formed of polyurethane, polyolefin, polyethylene, and/or the like, but is not limited thereto. When the first partition 1700, the first to sixth pads 811 to 816 and the seventh to twelfth pads 821 to 826 are formed of different materials, the materials may be the same materials having different adhesive forces. Alternatively, the materials may differ and may have different adhesive forces, but are not limited thereto. In this case, a degree to which the display panel 100 is pulled may be reduced in a process of attaching the display panel 100 and the supporting member 300 on the first to sixth pads 811 to 816 and the seventh to twelfth pads 821 to 826 in the first partition 1700, thereby preventing the wave phenomenon.

The fifth pad 815, the sixth pad 816, the eleventh pad 825, and the twelfth pad 826 may more reduce the peak or the dipping caused by interference between the reflected wave and a progressive wave and may better prevent sound quality from being degraded by the standing wave or the reflected wave. Therefore, because a partition and a pad are formed of different materials, the wave phenomenon may decrease, and the peak or the dipping caused by the standing wave based on the pad may be more reduced, thereby enhancing a sound output characteristic.

Figure 10A:
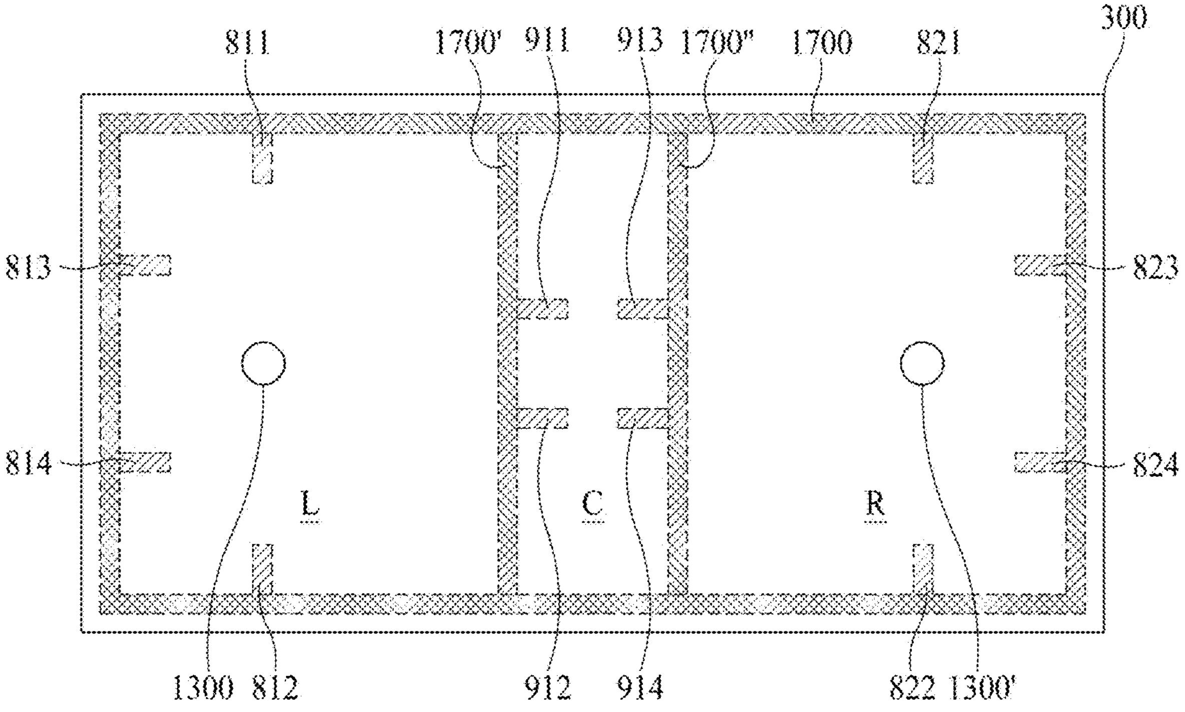
FIGS. 10A to 10C illustrate a sound generating device and a partition in a display apparatus according to another embodiment of the present disclosure.
Figure 10B:
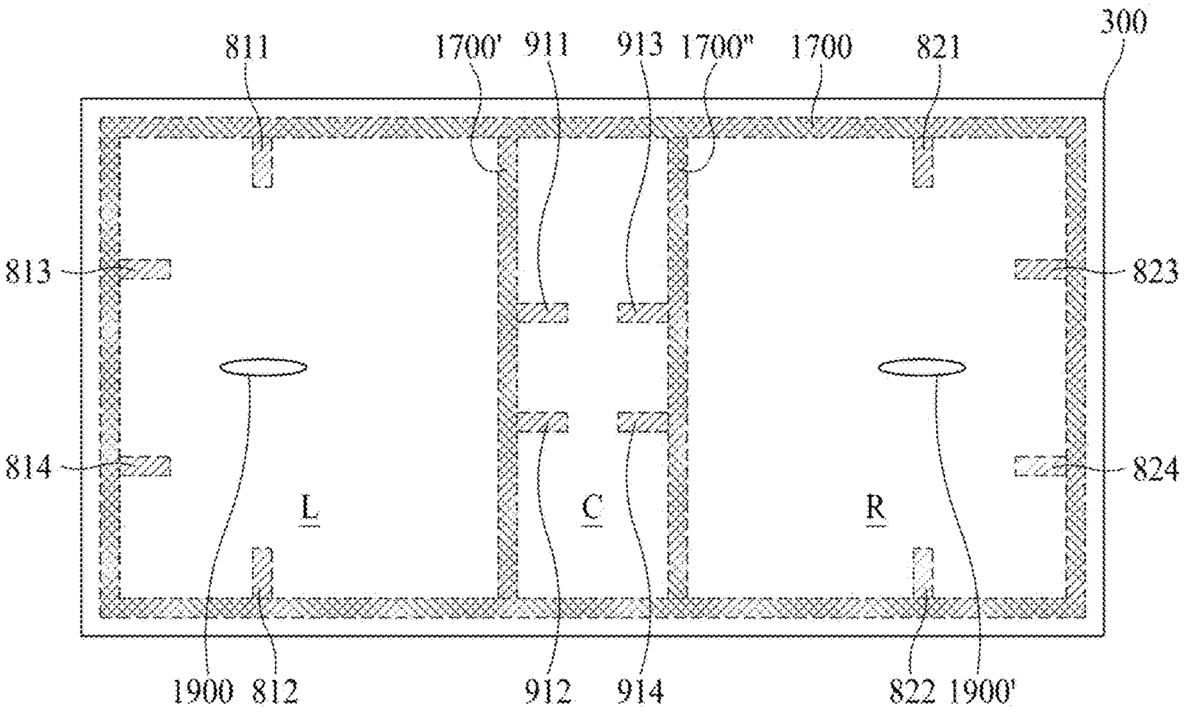
Figure 10C:
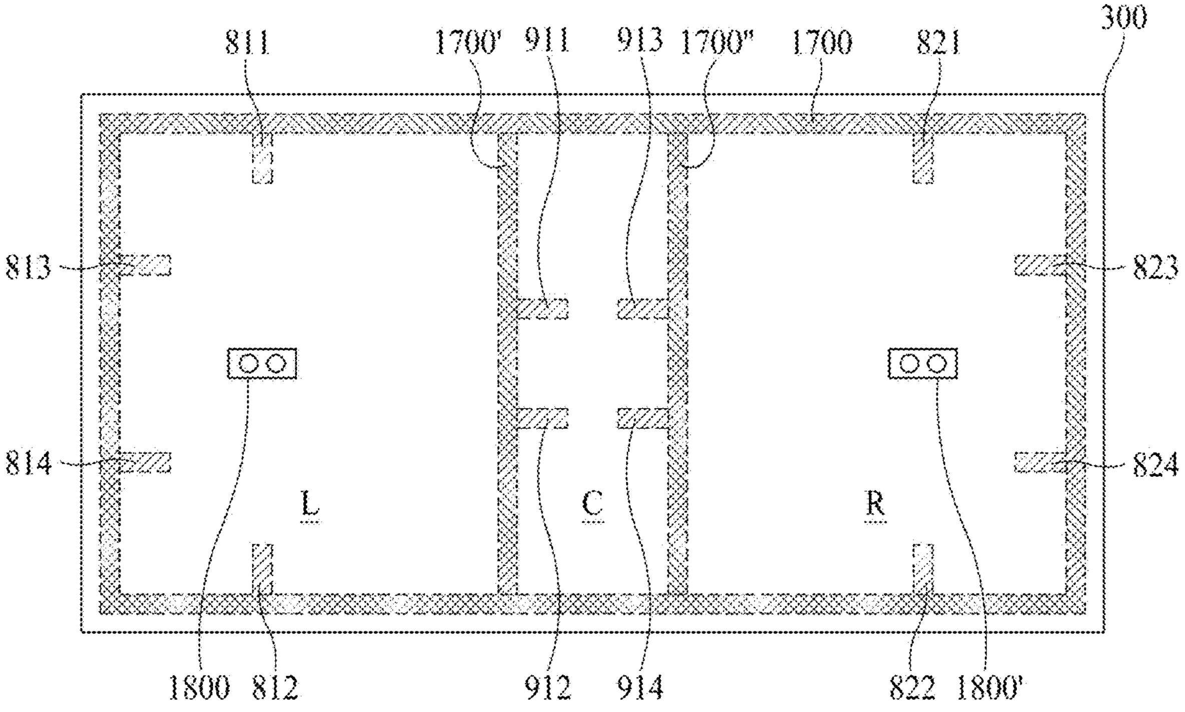

FIGS. 10A to 10C illustrate a sound generating device and a partition in a display apparatus according to another embodiment of the present disclosure.

In FIGS. 10A to 10C, the same descriptions as descriptions given above with reference to FIGS. 8A to 8C are omitted or will be briefly given below. For example, descriptions of a sound generating device and a pad are omitted or will be briefly given below. A partition, a pad, and a member will be described below with reference to FIG. 10A, and their descriptions may be identically applied to FIGS. 10B and 10C.

With reference to FIGS. 10A to 10C, a pad may be in at least one side of a first partition 1700 to decrease a peak and dipping, which are caused by a standing wave occurring in a lengthwise direction of the first and second sound generating devices. For example, the first partition 1700 may include a first side and a second side vertical to the first side, and a first pad 811 and a seventh pad 821 may be in the first side. A second pad 812 and an eighth pad 822 may be further on a side facing the first side of the first partition 1700. A third pad 813, a fourth pad 814, a ninth pad 823, and a tenth pad 824 may be in the second side of the first partition 1700. Descriptions of the first to fourth pads 811 to 814 and the seventh to tenth pads 821 to 824 are the same as descriptions given above with reference to FIGS. 8A to 8C, and thus, are omitted but will be simply given below.

With reference to FIG. 10A, at least one first member 911 and at least one second member 912 may be further on one side of a second partition 1700'. At least one third member 913 and at least one fourth member 914 may be further on one side of a third partition 1700". The at least one first member 911 and the at least one second member 912 may be in a third region C and may be between the third pad 813 and the fourth pad 814. The at least one third member 913 and the at least one fourth member 914 may be in the third region C and may be between the ninth pad 823 and the tenth pad 824. The at least one first member 911 and the at least one second member 912 may be in a widthwise direction of the display panel 100 or the supporting member 300. The at least one third member 913 and the at least one fourth member 914 may be in the widthwise direction of the display panel 100 or the supporting member 300. The first member 911 and the second member 912 may prevent a vibration generated by the first sound generating device 1300 from passing over the second partition 1700'. The third member 913 and the fourth member 914 may prevent a vibration generated by the second sound generating device 1300' from passing over the third partition 1700". Accordingly, the first to fourth members 911 to 914 may control a wave or a vibration that is generated between the second partition 1700' and the third partition 1700" and is transferred to a first region L and/or a second region R, thereby providing a display apparatus with a more enhanced sound output characteristic.

The first member 911 and the second member 912 may be disposed symmetrically or asymmetrically with respect to the first sound generating device 1300. For example, the first member 911 or the second member 912 may be disposed on or under the third member 913 or the fourth member 914 with respect to the first sound generating device 1300. In FIG. 10A, it is illustrated that the first member 911 and the second member 912 are provided as two and the third member 913 and the fourth member 914 are provided as two. However, the present embodiment is not limited thereto, and the first member 911 and the third member 913 may be provided as one or as a plurality. For example, only one of the first member 911 and the second member 912 may be provided, or only one of the third member 913 and the fourth member 914 may be provided. When one of the first member 911 and the second member 912 is provided or one of the third member 913 and the fourth member 914 is provided, the first member 911 and the third member 913 may be disposed symmetrically with respect to the first sound generating device 1300. For example, the first member 911 and the third member 913 may be disposed on the same line as the first sound generating device 1300 with respect to the first sound generating device 1300. As another example, the first member 911 and the third member 913 may be disposed on the same line as the second sound generating device 1300' with respect to the second sound generating device 1300'. When the first member 911 and the second member 912 are provided as one or the third member 913 and the fourth member 914 are provided as one, the first member 911 and the third member 913 may be disposed asymmetrically with respect to the first sound generating device 1300. For example, the first member 911 may be on the first sound generating device 1300 with respect to the first sound generating device 1300, and the third member 913 may be under the first sound generating device 1300 with respect to the first sound generating device 1300. As another example, the first member 911 may be on the second sound generating device 1300' with respect to the second sound generating device 1300', and the third member 913 may be under the second sound generating device 1300' with respect to the second sound generating device 1300'.

The first to fourth members 911 to 914 may be formed of one of a double-sided tape, a single-sided tape, an adhesive, and a bond. The first to fourth members 911 to 914 may be in a widthwise direction of the display panel 100, and thus, when the first to fourth members 911 to 914 are formed of materials that differ from those of the third and fourth pads 813 and 814 or the ninth and tenth pads 823 and 824, the wave phenomenon may occur due to different adhesive forces when contacting the display panel 100. Therefore, when the first to fourth members 911 to 914 are formed of the same material as that of the third and fourth pads 813 and 814 or the ninth and tenth pads 823 and 824, the wave phenomenon may be reduced, and the occurrence of an abnormal sound may be reduced. The first member 911 and the second member 912 may be formed of the same material as that of the third pad 813 and the fourth pad 814. The third pad 813 and the fourth pad 814 may be formed of the same material as that of the first pad 811 or the second pad 812. The third member 913 and the fourth member 914 may be formed of the same material as that of the ninth pad 823 and the tenth pad 824. The third pad 813 and the fourth pad 814 may be formed of the same material as that of the first pad 811 or the second pad 812. The ninth pad 823 and the tenth pad 824 may be formed of the same material as that of the first pad 811 and the second pad 812. For example, the first to fourth members 911 to 914 may be formed of a single-sided tape. The single-sided tape may include a foam material, which absorbs an impact when contacting the display panel 100. When the single-sided tape does not include the foam material, it may be seen that an undesired abnormal sound occurs due to contacting the display panel 100. The single-sided tape may be formed of, for example, polyurethane, polyolefin, polyethylene, and/or the like, but is not limited thereto.

A shape of the first to fourth pads 811 to 814, a shape of the seventh to tenth pads 821 to 824, and a shape of the first to fourth members 911 to 914 may be a tetragonal (e.g., quadrilateral) shape or an end-rounded tetragonal (e.g., quadrilateral) shape, but are not limited thereto and may be provided as various shapes such as a circular shape.

Therefore, because a partition is configured based on a shape of a display panel and one or more pad parts are provided on at least one side of the partition, the wave phenomenon may decrease, and the peak or the dipping caused by the standing wave may be reduced, thereby enhancing a sound output characteristic. Also, because the partition and the pad parts are formed of different materials, the wave phenomenon may decrease, and the occurrence of an abnormal sound may be prevented, thereby enhancing a sound output characteristic. Furthermore, because a member is further provided, a sound output characteristic may be more enhanced.

Figure 11A:
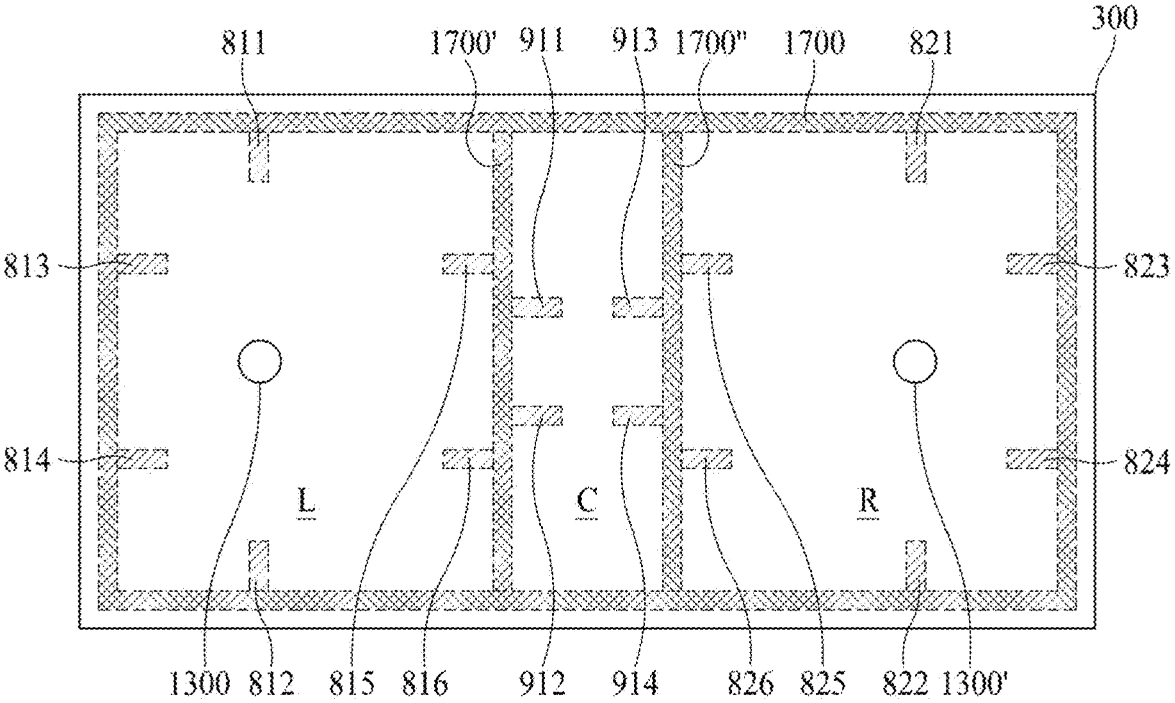
FIGS. 11A to 11C illustrate a sound generating device and a partition in a display apparatus according to another embodiment of the present disclosure.
Figure 11B:
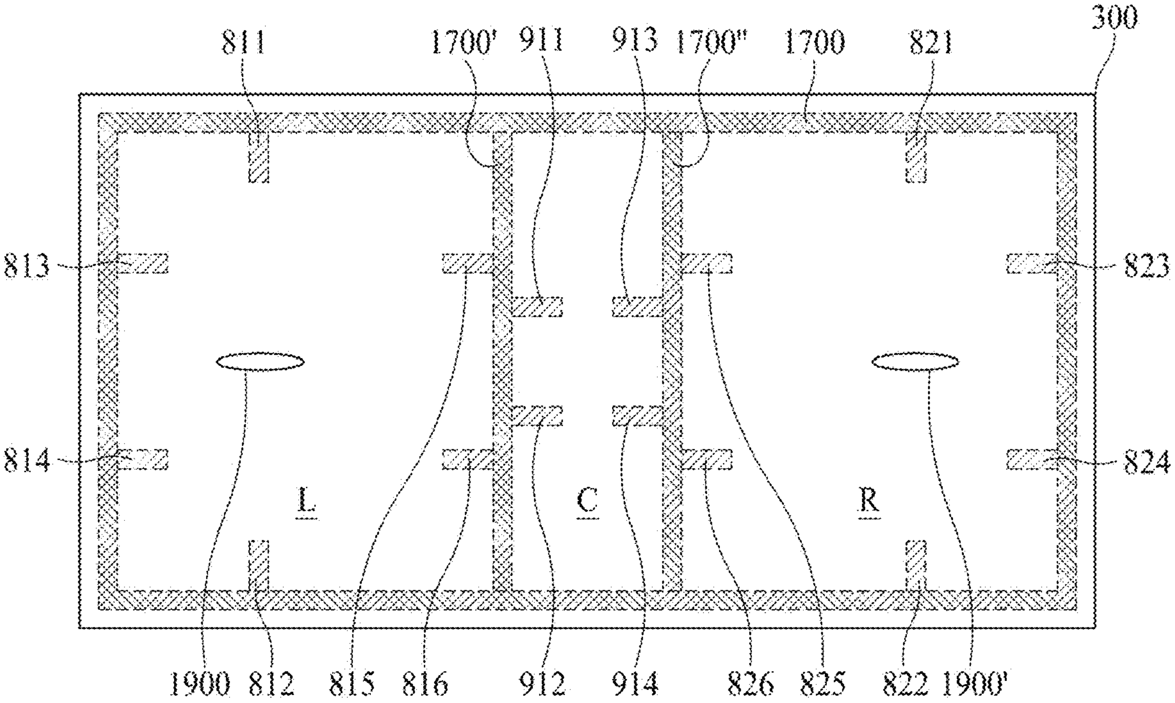
Figure 11C:
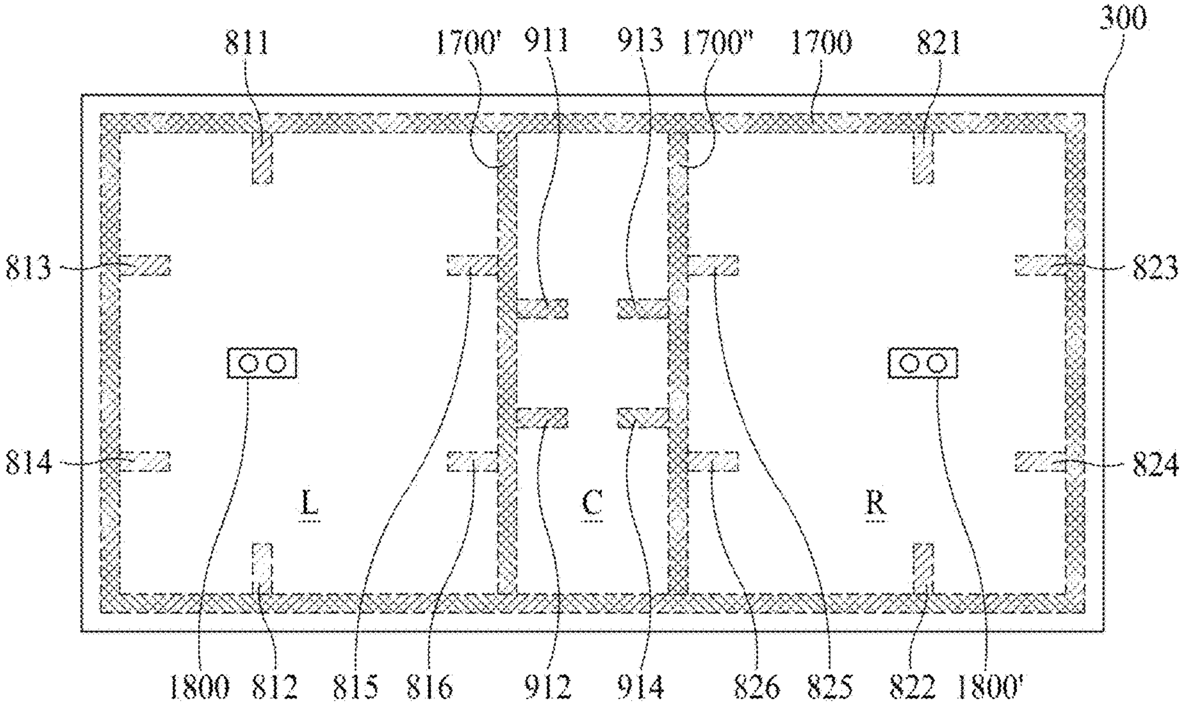

FIGS. 11A to 11C illustrate a sound generating device and a partition in a display apparatus according to another embodiment of the present disclosure.

In FIGS. 11A to 11C, the same descriptions as descriptions given above with reference to FIGS. 8A to 8C are omitted or will be briefly given below. For example, descriptions of a sound generating device and a pad are omitted or will be briefly given below. A partition, a pad, and a member will be described below with reference to FIG. 11A, and their descriptions may be identically applied to FIGS. 11B and 11C.

With reference to FIGS. 11A to 11C, a pad may be provided in at least one side of a first partition 1700 to decrease a peak and dipping, which are caused by a standing wave occurring in a lengthwise direction of the first and second sound generating devices. For example, the first partition 1700 may include a first side and a second side vertical to the first side, and a first pad 811 and a seventh pad 821 may be provided in the first side. A second pad 812 and an eighth pad 822 may be further provided on a side facing the first side of the first partition 1700. A third pad 813, a fourth pad 814, a ninth pad 823, and a tenth pad 824 may be provided in the second side of the first partition 1700. Descriptions of the first to fourth pads 811 to 814 and the seventh to tenth pads 821 to 824 are the same as descriptions given above with reference to FIGS. 8A to 8C, and thus, are omitted but will be simply given below.

With reference to FIG. 11A, at least one fifth pad 815, sixth pad 816, eleventh pad 825, and twelfth pad 826 may be further provided on a side facing the second side of the first partition 1700. For example, the fifth pad 815 and the sixth pad 816 may be in a side, facing the second side of the first partition 1700, of a first region L and may be disposed on one side of a second partition 1700'. For example, the eleventh pad 825 and the twelfth pad 826 may be on a side, facing the second side of the first partition 1700, of a second region R and may be on one side of the third partition 1700". The fifth pad 815 and the sixth pad 816 may be provided to face the third pad 813 and the fourth pad 814. For example, the fifth pad 815 and the sixth pad 816 may be disposed to be symmetrical with respect to a first sound generating device 1300. The eleventh pad 825 and the twelfth pad 826 may be provided to face the ninth pad 823 and the tenth pad 824. For example, the eleventh pad 825 and the twelfth pad 826 may be disposed to be symmetrical with respect to a second sound generating device 1300'.

The at least one fifth pad 815 or the at least one sixth pad 816 may be formed of a material differing from that of the first partition 1700. The at least one fifth pad 815 or the at least one sixth pad 816 may be formed of a material differing from that of at least one of the first partition 1700, the second partition 1700', and the third partition 1700". The at least one fifth pad 815 or the at least one sixth pad 816 may be formed of the same material as that of the at least one first pad 811.

The at least one eleventh pad 825 or the at least one twelfth pad 826 may be formed of a material differing from that of the first partition 1700. The at least one eleventh pad 825 or the at least one twelfth pad 826 may be formed of a material differing from that of at least one of the first partition 1700, the second partition 1700', and the third partition 1700". The at least one eleventh pad 825 or the at least one twelfth pad 826 may be formed of the same material as that of the at least one first pad 811. The at least one eleventh pad 825 or the at least one twelfth pad 826 may be formed of the same material as that of the at least one seventh pad 821.

The first to sixth pads 811 to 816 and the seventh to twelfth pads 821 to 826 may be formed of a material differing from that of the first partition 1700. The first to sixth pads 811 to 816 and the seventh to twelfth pads 821 to 826 may be formed of a material differing from that of the second partition 1700' or the third partition 1700". For example, the first to sixth pads 811 to 816 and the seventh to twelfth pads 821 to 826 may be formed of a single-sided tape. The single-sided tape may include a foam material, which absorbs an impact when contacting the display panel 100. When the single-sided tape does not include the foam material, an undesired abnormal sound may occur due to contacting the display panel 100. For example, the single-sided tape may be formed of polyurethane, polyolefin, polyethylene, and/or the like, but is not limited thereto. When the first partition 1700, the first to sixth pads 811 to 816 and the seventh to twelfth pads 821 to 826 are formed of different materials, the materials may be the same materials having different adhesive forces. Alternatively, the materials may differ and may have different adhesive forces, but are not limited thereto. In this case, a degree to which the display panel 100 is pulled may be reduced in a process of attaching the display panel 100 and the supporting member 300 on the first to sixth pads 811 to 816 and the seventh to twelfth pads 821 to 826 disposed in the first partition 1700, thereby preventing the wave phenomenon.

At least one first member 911 or at least one second member 912 may be further provided in at least one side of the second partition 1700'. At least one third member 913 or at least one fourth member 914 may be further in at least one side of the third partition 1700". The first to fourth members 911 to 914 are as described above with reference to FIGS. 10A to 10C, and thus, their detailed descriptions are omitted.

Therefore, because a partition is configured based on a shape of a display panel and one or more pad parts are provided on at least one side of the partition, the wave phenomenon may decrease, and the peak or the dipping caused by the standing wave may be reduced, thereby enhancing a sound output characteristic. Also, because the partition and the pad parts are formed of different materials, the wave phenomenon may decrease, and the occurrence of an abnormal sound may be prevented, thereby enhancing a sound output characteristic. Furthermore, because a member is further provided, a sound output characteristic may be more enhanced.

Because the display apparatus according to the embodiments of the present disclosure includes the sound generating device, which vibrates the display panel to generate a sound, the sound of the display apparatus may be output to a region in front of the display panel. Accordingly, immersion of a viewer who is watching an image displayed by the display apparatus is enhanced.

Moreover, because the display apparatus according to the embodiments of the present disclosure includes the sound generating device, which vibrates the display panel to generate a sound, a speaker may not be provided, and thus, a degree of freedom in design and element disposition of a set apparatus is enhanced.

Moreover, according to the embodiments of the present disclosure, a supporting member and a sound generating device may be spaced apart from each other, thereby providing a display apparatus for enhancing a sound output characteristic of a low-pitched sound band.

Moreover, according to the embodiments of the present disclosure, the supporting member and the sound generating device may be disposed apart from each other, and a connection part may be provided between the supporting member and the sound generating device, thereby providing a display apparatus for enhancing a sound output characteristic of a low-pitched sound band.

Moreover, in the display apparatus according to the embodiments of the present disclosure, a partition and at least one pad disposed on at least one side of the partition may be provided, and thus, peak and dipping caused by a standing wave may be reduced, thereby enhancing a sound output characteristic.

Moreover, in the display apparatus according to the embodiments of the present disclosure, at least one pad may be provided on at least one side of the partition, and at least one member may be provided on at least one side of the partition, thereby decreasing a wave phenomenon of the display panel. Accordingly, a display apparatus with an enhanced sound output characteristic may be provided.

Moreover, according to the embodiments of the present disclosure, because the partition is provided between one or more sound generating devices disposed on the display panel, the partition may separate sounds, thereby providing a display apparatus that realizes a stereo sound and has an enhanced sound output characteristic.

Moreover, in the display apparatus according to the embodiments of the present disclosure, the partition, at least one pad disposed on at least one side of the partition, and at least one member may be provided, and at least one of the partition, the pad, and the member may include different materials, thereby decreasing a wave phenomenon of the display panel.

A sound generating device according to an embodiment of the present disclosure may be applied as a sound generating device in a display apparatus. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, portable multimedia players (PMPs), personal digital assistants (PDAs), electronic organizers, desktop personal computers (PCs), laptop PCs, netbook computers, workstations, navigation apparatuses, automotive navigation apparatuses, automotive display apparatuses, TVs, wall paper display apparatuses, signage apparatuses, game machines, notebook computers, monitors, cameras, camcorders, home appliances, etc. Also, the sound generating device according to an embodiment of the present disclosure may be applied to organic light emitting lighting apparatuses or inorganic light emitting lighting apparatuses. When the sound generating device is applied to a lighting apparatus, the sound generating device may act as lighting and a speaker.

A display apparatus according to an embodiment of the present disclosure will be described as follows.

According to an embodiment of the present disclosure, a display apparatus includes a display panel configured to display an image; a supporting member on a rear surface of the display panel and configured to support the display panel; a sound generating device on the rear surface of the display panel and configured to vibrate the display panel to generate sound; and a connection part configured to connect the supporting member to the sound generating device, wherein the sound generating device includes a plate spaced apart from the supporting member; a frame outside the plate; a magnet and a center pole on the plate; a bobbin around the center pole; and a coil outside the bobbin, wherein the connection part is between the supporting member and the frame.

For example, the display apparatus according to an embodiment of the present disclosure may further include a coupling member under the supporting member to couple the sound generating device to the supporting member, wherein the connection part is between the coupling member and the frame.

For example, the coupling member according to an embodiment of the present disclosure may further include a nut and a screw, and the connection part is between the screw and the frame.

For example, the display apparatus according to an embodiment of the present disclosure may further include the connection part between the coupling member and a lower portion of the frame.

For example, the display apparatus according to an embodiment of the present disclosure may further include the connection part between the coupling member and each corner of the frame.

For example, the display apparatus according to an embodiment of the present disclosure may further include the connection part between the coupling member and the frame and along a periphery of the frame.

For example, the display apparatus according to an embodiment of the present disclosure may further include the connection part on a same plane between the supporting member and the plate.

For example, the display apparatus according to an embodiment of the present disclosure may further include the connection part configured to provide elasticity to the plate based on the vibration of the sound generating device.

For example, the display apparatus according to an embodiment of the present disclosure may further include the sound generating device further including a damper between the frame and the bobbin; and the sound generating device configured to vibrate the display panel using the plate, the magnet, the center pole, the bobbin, the coil, the frame, and the damper to generate sound.

For example, the display apparatus according to an embodiment of the present disclosure may further include the sound generating device including one or more of a circular sound generating device, an oval sound generating device, and a pair of sound generating devices.

According to an embodiment of the present disclosure, a display apparatus includes a display panel configured to display an image and including a first region, a second region, and a third region; a sound generating device in at least one of the first region, the second region, and the third region at a rear surface of the display panel; a supporting member on the rear surface of the display panel, the supporting member being spaced apart from the sound generating device; and a connection part between the sound generating device and the supporting member.

For example, the display apparatus according to an embodiment of the present disclosure may further include the sound generating device including a plate; a frame outside the plate; a magnet and a center pole on the plate; a bobbin around the center pole; and a coil outside the bobbin.

For example, the display apparatus according to an embodiment of the present disclosure may further include a coupling member to couple the sound generating device to the supporting member, wherein the connection part is between the coupling member and the frame.

For example, the display apparatus according to an embodiment of the present disclosure may further include the connection part on a same plane between the supporting member and the plate.

For example, the display apparatus according to an embodiment of the present disclosure may further include the connection part configured to provide elasticity to the plate based on the vibration of the sound generating device.

For example, the display apparatus according to an embodiment of the present disclosure may further include a first partition between the display panel and the supporting member, the first partition including a first side and a second side vertical to the first side; a second partition between the first region and the third region; and a third partition between the second region and the third region.

For example, the display apparatus according to an embodiment of the present disclosure may further include a first pad in the first region and the first side; and a second pad in a side facing the first pad, wherein the first pad or the second pad comprises a material differing from a material of the first partition.

For example, the display apparatus according to an embodiment of the present disclosure may further include a third pad or a fourth pad in the second region and the second side, wherein the third pad or the fourth pad comprises the same material as a material of the first pad.

For example, the display apparatus according to an embodiment of the present disclosure may further include a seventh pad in the second region and the first side; and an eighth pad in a side facing the first pad, wherein the seventh pad or the eighth pad comprises the same material as a material of the at least one first pad.

For example, the display apparatus according to an embodiment of the present disclosure may further include a ninth pad or a tenth pad in the second region and the first side, wherein the ninth pad or the tenth pad comprises the same material as a material of the first pad.

For example, the display apparatus according to an embodiment of the present disclosure may further include one of the second partition and the third partition including a material differing from a material of the first pad.

For example, the display apparatus according to an embodiment of the present disclosure may further include a fifth pad or a sixth pad in the first region and one side of the second partition, wherein the fifth pad or the sixth pad comprises the same material as a material of the first pad.

For example, the display apparatus according to an embodiment of the present disclosure may further include an eleventh pad or a twelfth pad in the second region and one side of the third partition, wherein the eleventh pad or the twelfth pad comprises the same material as a material of the first pad.

For example, the display apparatus according to an embodiment of the present disclosure may further include a first member or a second member in the third region and one side of the second partition, wherein the first member or the second member comprises the same material as a material of the first pad.

For example, the display apparatus according to an embodiment of the present disclosure may further include a third member or a fourth member in the third region and one side of the third partition, wherein the third member or the fourth member comprises the same material as a material of the first pad.

For example, the display apparatus according to an embodiment of the present disclosure may further include one of the second partition and the third partition including the same material as a material of the first partition.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A sound generating device, comprising:
- a plate;
- a frame outside of the plate;
- a magnet at the plate;
- a bobbin around the magnet;
- a coil outside the bobbin; and
- a connection part connected to the frame,
- wherein the connection part includes:
  - a plurality of first connection parts configured around the frame and connected to the frame; and
  - a second connection part configured around the frame and connected to the plurality of first connection parts, and
- wherein the connection part is configured to vibrate together with a vibration of the frame, and
- wherein a length of each of the plurality of first connection parts disposed between the frame and the second connection part is greater than a shortest length between the frame and the second connection part.

2. The sound generating device of claim 1, wherein each of the plurality of first connection parts is configured to vibrate together with a vibration of the frame.

3. The sound generating device of claim 1, wherein the plurality of first connection parts are configured to extend from the frame to the second connection part.

4. The sound generating device of claim 1, wherein the plurality of first connection parts and the second connection part are on a same plane.

5. The sound generating device of claim 1, wherein: the plurality of first connection parts are configured to be spaced apart from each other along a periphery of the frame in a space between the frame and the second connection part, or the plurality of first connection parts are disposed between the frame and the second connection part and are configured to be spaced apart from each other along a periphery of the frame.

6. The sound generating device of claim 1, wherein the plurality of first connection parts and the second connection part are configured as one body or a single body.

7. The sound generating device of claim 1, wherein at least one among the plurality of first connection parts includes a deformable metal material or a deformable plastic material.

8. A display apparatus, comprising:

a display panel configured to display an image;

a supporting member at a rear surface of the display panel;

a sound generating device at the rear surface of the display panel and configured to vibrate the display panel; and a connection part at a rear surface of the supporting member and connected to the sound generating device, the connection part including a plurality of first connection parts and a second connection part, wherein a length of each of the plurality of first connection parts disposed between the sound generating device and the second connection part is greater than a shortest length between the sound generating device and the second connection part, wherein the supporting member and the sound generating device are configured to be spaced apart from each other in a horizontal direction, and wherein the connection part is configured to vibrate together with a vibration of the sound generating device.

9. The display apparatus of claim 8, wherein the connection part is configured in a space between the supporting member and the sound generating device.

10. The display apparatus of claim 8, further comprising a coupling member configured to couple the connection part to the rear surface of the supporting member, wherein the connection part is configured between the coupling member and the sound generating device.

11. The display apparatus of claim 8, wherein:

the plurality of first connection parts are connected to the sound generating device and are spaced apart from each other; and the second connection part is connected to the plurality of first connection parts and is connected to the rear surface of the supporting member.

12. The display apparatus of claim 11, further comprising a coupling member configured to couple the second connection part to the rear surface of the supporting member.

13. The display apparatus of claim 12, wherein:

the plurality of first connection parts are between the coupling member and each corner of the sound generating device, or the plurality of first connection parts and the second connection part are on a same plane between the sound generating device and the coupling member.

14. The display apparatus of claim 11, further comprising a coupling member including a nut and a screw, wherein the second connection part is coupled to the rear surface of the supporting member by the coupling member.

15. The display apparatus of claim 11, wherein the second connection part is configured to surround the sound generating device with the plurality of first connection parts therebetween.

16. The display apparatus of claim 11, wherein the plurality of first connection parts and the second connection part are configured as one body or a single body.

17. The sound generating device of claim 11, wherein:

each of the plurality of first connection parts is configured to vibrate together with a vibration of the sound generating device, or at least one among the plurality of first connection parts includes a deformable metal material or a deformable plastic material.

18. The sound generating device of claim 11, wherein the sound generating device comprises:

a plate;

a frame outside the plate and spaced apart from the supporting member;

a magnet at the plate;

a bobbin around the magnet and coupled to the display panel; and a coil outside the bobbin.

19. The display apparatus of claim 18, wherein the plurality of first connection parts are configured to extend from the frame to the second connection part, and wherein each of the plurality of first connection parts is configured to vibrate together with a vibration of the sound generating device.

20. The display apparatus of claim 18, wherein the plurality of first connection parts are configured to extend from the frame to the second connection part.

21. The display apparatus of claim 18, wherein the plurality of first connection parts and the second connection part are on a same plane.

22. The display apparatus of claim 18, wherein:

the plurality of first connection parts are configured to be spaced apart from each other along a periphery of the frame in a space between the frame and the second connection part, or the plurality of first connection parts are disposed between the frame and the second connection part and are configured to be spaced apart from each other along a periphery of the frame.

* * * * *